US011108840B2

United States Patent
Shi et al.

(10) Patent No.: US 11,108,840 B2
(45) Date of Patent: Aug. 31, 2021

(54) TRANSPORT LAYER NETWORK SERVICE FOR LIVE CONTENT BROADCASTING

(71) Applicants: AT&T Intellectual Property I, L.P., Atlanta, GA (US); New York University, New York, NY (US)

(72) Inventors: Shu Shi, Secaucus, NJ (US); Rittwik Jana, Montville, NJ (US); Hung-Hsiang Jonathan Chao, Holmdel, NJ (US); Yang Xu, Livingston, NJ (US); Bo Yan, Brooklyn, NY (US)

(73) Assignees: AT&T Intellectual Property I, L.P., Atlanta, GA (US); New York University, New York, NY (US)

( * ) Notice: Subject to any disclaimer, the term of this patent is extended or adjusted under 35 U.S.C. 154(b) by 206 days.

(21) Appl. No.: 15/641,049

(22) Filed: Jul. 3, 2017

(65) Prior Publication Data

US 2019/0007475 A1  Jan. 3, 2019

(51) Int. Cl.
*H04N 21/222* (2011.01)
*H04N 21/2187* (2011.01)
(Continued)

(52) U.S. Cl.
CPC ........ *H04L 65/601* (2013.01); *G06F 9/45533* (2013.01); *G06F 9/45558* (2013.01);
(Continued)

(58) Field of Classification Search
CPC ........... H04N 21/6405; H04N 21/4622; H04N 21/2393; H04N 21/2225; H04N 21/2665;
(Continued)

(56) References Cited

U.S. PATENT DOCUMENTS 6,434,622 B1   8/2002   Monteiro et al.
6,473,793 B1   10/2002  Dillon et al.
(Continued)

FOREIGN PATENT DOCUMENTS

CN   102244773 A   11/2011
CN   102244773 B   6/2013
WO   2016181383 A2  11/2016

OTHER PUBLICATIONS

Alam, Kazi et al., "VeDi: A vehicular crowdsourced video social network for VANETs", (Section III on pp. 739-741)., 2014.
(Continued)

*Primary Examiner* — Tonia L Dollinger
*Assistant Examiner* — Linh T. Nguyen
(74) *Attorney, Agent, or Firm* — John G. Rauch; Guntin & Gust, PLC

(57) ABSTRACT

Aspects of the subject disclosure may include, for example, a virtual processing system initiating a first streaming session with a content streaming server to receive content data, creating a first transport connection with a viewer streaming the content data in a second streaming session with the content streaming server by imitating a transport connection of the content streaming server with the viewer, creating a second transport connection with the content streaming server by imitating a transport connection of the viewer with the content streaming server, splitting the first streaming session between the content streaming server and the viewer, and streaming the content data to the viewer. Other embodiments are disclosed.

20 Claims, 11 Drawing Sheets

(51) Int. Cl.
    *H04L 29/06* (2006.01)
    *H04L 29/08* (2006.01)
    *G06F 9/455* (2018.01)
(52) U.S. Cl.
    CPC ...... *H04L 65/1016* (2013.01); *H04L 65/4076* (2013.01); *H04L 65/608* (2013.01); *H04L 69/326* (2013.01); *H04N 21/2187* (2013.01); *H04N 21/222* (2013.01); *G06F 2009/45595* (2013.01); *H04L 69/163* (2013.01)
(58) Field of Classification Search
    CPC ........ H04N 21/4331; H04N 21/23106; H04N 21/2187; H04N 21/2181; H04N 21/25841; H04N 21/4668; H04L 65/4084; H04L 67/2842; H04L 67/1021; H04L 67/18; H04L 67/26; H04L 67/28; H04L 67/2819; H04L 67/42; H04L 67/10; H04L 67/02; H04L 43/0811; H04L 47/10; H04L 47/193; H04L 63/0272; H04L 67/14; H04L 67/141; H04L 69/329; H04L 67/2847; H04L 65/4015; H04L 65/605; H04L 67/1095; H04L 67/2838; H04L 41/0823; H04L 29/06047; H04L 67/303; G06F 9/45558; G06F 2201/815; G06F 16/188; G06F 16/957; G06F 16/9574; G06F 2009/4557; G06F 2209/541
    See application file for complete search history.

(56) References Cited

U.S. PATENT DOCUMENTS

| | | | | |
|---|---|---|---|---|
| 6,553,413 | B1* | 4/2003 | Leighton | H04L 29/12066 709/219 |
| 7,143,177 | B1 | 11/2006 | Johnson et al. | |
| 7,711,844 | B2 | 5/2010 | Schuehler et al. | |
| 8,472,326 | B2 | 6/2013 | Morrill et al. | |
| 8,670,313 | B2 | 3/2014 | Ray et al. | |
| 9,021,134 | B1 | 4/2015 | Patel | |
| 9,112,946 | B2 | 8/2015 | Park et al. | |
| 9,531,760 | B2 | 12/2016 | Lajoie et al. | |
| 9,584,835 | B2 | 2/2017 | Tremblay | |
| 2003/0005455 | A1* | 1/2003 | Bowers | H04N 21/4622 725/90 |
| 2004/0049596 | A1 | 3/2004 | Schuehler et al. | |
| 2007/0008884 | A1 | 1/2007 | Tang et al. | |
| 2007/0250636 | A1 | 10/2007 | Stephens et al. | |
| 2010/0226444 | A1 | 9/2010 | Thevathasan et al. | |
| 2010/0235431 | A1* | 9/2010 | Poluri | G06F 11/2066 709/203 |
| 2010/0281105 | A1* | 11/2010 | Sebastian | H04L 12/1859 709/203 |
| 2010/0325287 | A1* | 12/2010 | Jagadeeswaran | H04L 67/02 709/227 |
| 2011/0131573 | A1* | 6/2011 | Antony | G06F 3/023 718/1 |
| 2012/0110118 | A1* | 5/2012 | Luna | H04L 67/2842 709/217 |
| 2014/0215267 | A1* | 7/2014 | Hegdal | G06F 11/0712 714/20 |
| 2014/0344332 | A1* | 11/2014 | Giebler | H04L 67/2823 709/203 |
| 2015/0295726 | A1 | 10/2015 | Bland | |
| 2016/0035034 | A1 | 2/2016 | Mathews | |
| 2016/0044115 | A1* | 2/2016 | Hill et al. | H04L 29/08 |
| 2016/0204887 | A1 | 7/2016 | Lee et al. | |
| 2016/0227263 | A1 | 8/2016 | Lee | |
| 2016/0255129 | A1 | 9/2016 | Walker et al. | |
| 2016/0285923 | A1 | 9/2016 | Kodaypak | |
| 2016/0301724 | A1 | 10/2016 | Kodaypak | |
| 2016/0337426 | A1 | 11/2016 | Shribman | |
| 2016/0359574 | A1 | 12/2016 | Lee et al. | |
| 2016/0359744 | A1 | 12/2016 | Kwak et al. | |
| 2017/0111665 | A1* | 4/2017 | Suryanarayanan | H04N 21/2662 |
| 2017/0142450 | A1* | 5/2017 | Ghosal | H04N 21/2187 |
| 2017/0171264 | A1* | 6/2017 | Salomons | H04N 21/2402 |
| 2017/0188054 | A1* | 6/2017 | Ma | H04L 67/2814 |
| 2017/0214608 | A1* | 7/2017 | Jilani | H04L 45/566 |
| 2017/0272792 | A1* | 9/2017 | Bachmutsky | H04N 21/24 |
| 2017/0353747 | A1 | 12/2017 | Thomas et al. | |
| 2017/0374121 | A1* | 12/2017 | Phillips | H04N 21/2402 |
| 2017/0374417 | A1* | 12/2017 | Hernandez-Mondragon | H04N 21/4312 |
| 2018/0048730 | A1* | 2/2018 | Knecht | H04L 67/2828 |
| 2018/0048731 | A1* | 2/2018 | Yeager et al. | H04L 65/601 709/227 |
| 2018/0183658 | A1* | 6/2018 | Fromentoux | H04L 41/5025 |
| 2019/0007716 | A1 | 1/2019 | Shi et al. | |
| 2019/0215548 | A1 | 7/2019 | Shi et al. | |
| 2019/0332511 | A1* | 10/2019 | Morgan | G06F 11/30 |

OTHER PUBLICATIONS

Ellerton, John et al., "Prospects for software defined networking and network function virtualization in media and broadcast", (Figures 2-5; pp. 11-17 for applications underway that appropriate existing structures for broadcasting)., 2015.

Moore, Derek et al., "Surrogate Joint Aerial Layer Network (JALN) Experiment: Applications of Commercial-Off-The-Shelf Technologies for Researching Future Jaln Challenges", (Figures 1-6; pp. 2-9; Section 3.5 on pp. 18-23)., 2014.

Osman, Niemah et al., "Energy efficient future high definition TV", (Section II on pp. 2365-2366; Figures 5-6 on pp. 2369-2370)., 2014.

Ponna, Chaitanya, "How Enable Efficient Information Interchanges in Virtual", (Section 6.5; pp. 7374), 2011.

* cited by examiner

100

200

300

TRANSPORT LAYER NETWORK SERVICE FOR LIVE CONTENT BROADCASTING

FIELD OF THE DISCLOSURE

The subject disclosure relates to a transport layer network service for live content broadcasting.

BACKGROUND

Much effort has been made to deliver live broadcast services over the past decade. In the early days, live content broadcast was built over IP multicast systems. However, as IP multicast faces practical deployment and management issues, it is only used in limited scenarios such as Internet Service Provider (ISP) oriented Internet Protocol Television (IPTV) services.

At the turn of the century, after year 2000, P2P-based live broadcasting systems won popularity to share video contents among end-user devices. P2P live streaming systems scale well under dynamic workloads, since each joining user acts as a reflected content source. However, P2P live streaming suffers from unstable video quality and severe latency up to minutes mainly due to peer churn and limited uplink bandwidth. In addition, P2P systems introduce significant user-side complexities and no longer fit the modern requirement of lightweight client implementation. Even though recent effort in augmenting P2P with cloud and content delivery network (CDN) can effectively reduce the latency and improve the streaming quality, the P2P nature makes it difficult for these systems to attract users preferring to watch live streams in a browser or on mobile devices.

Emerging commercial live content broadcasting platforms are facing great challenges to accommodate large scale dynamic viewer populations. On the one hand, more traditional TV programs, such as nightly news and sports games, are now streamed online in higher quality. Popular programs can easily attract millions of viewers. On the other hand, the emerging User-Generated Live Content (UGLC) are gaining tremendous popularity through various streaming platforms (such as Twitch, Facebook Live, and YouTube Live, etc.) and at the same time bringing new challenges. Any random UGLC may suddenly become viral on social media as the result of social cascading and recommender promotion, and cause a flash crowd of viewers to watch the same content within a few minutes. Without geographic and network distributions of the viewers, it is difficult to provision streaming resources to accommodate such unpredictable flash crowds in advance. Existing solutions constantly suffer from balancing the cost of deploying at the edge close to the viewers, the quality of content delivery, and the ability to rapidly scale in the face of near instantaneous, large viewer demand.

Various solutions to improve CDN performance for live broadcasting have been proposed. For instance, VDN developed a centralized streaming optimization and a hybrid control plane to reduce the startup latency and improve routing choices across different CDN clusters. Footprint shows the benefits of delivering streaming services by jointly optimizing the data center to provide the service, wide area network (WAN) transport connectivity and the proxy selection. C3 proposes to improve video quality by helping clients to select better CDN sites through data-driven analysis.

Moreover, many live streaming platforms encourage interactions between content generators and viewers. For instance, Twitch offers viewers a chat box to send feedbacks to the broadcasters, while Facebook Live enables viewers to click emoji buttons while watching a broadcast. Such interactive features require UGLC streaming to have the minimized latency. Traditional CDN-based live broadcasting systems are incapable of meeting all the new demands CDN providers aggregate to one or multiple data centers to take advantage of the elasticity of Virtual Machine (VM) resources and the flexibility of routing inside data centers. However, the lack of edge presence makes the streaming vulnerable to long playback lag and congestion fluctuations in Wide Area Networks (WAN). Leading live streaming platforms like YouTube and Twitch can suffer from occasional service interruption and unstable video quality.

BRIEF DESCRIPTION OF THE DRAWINGS

Reference will now be made to the accompanying drawings, which are not necessarily drawn to scale, and wherein.

DETAILED DESCRIPTION

Figure 1:
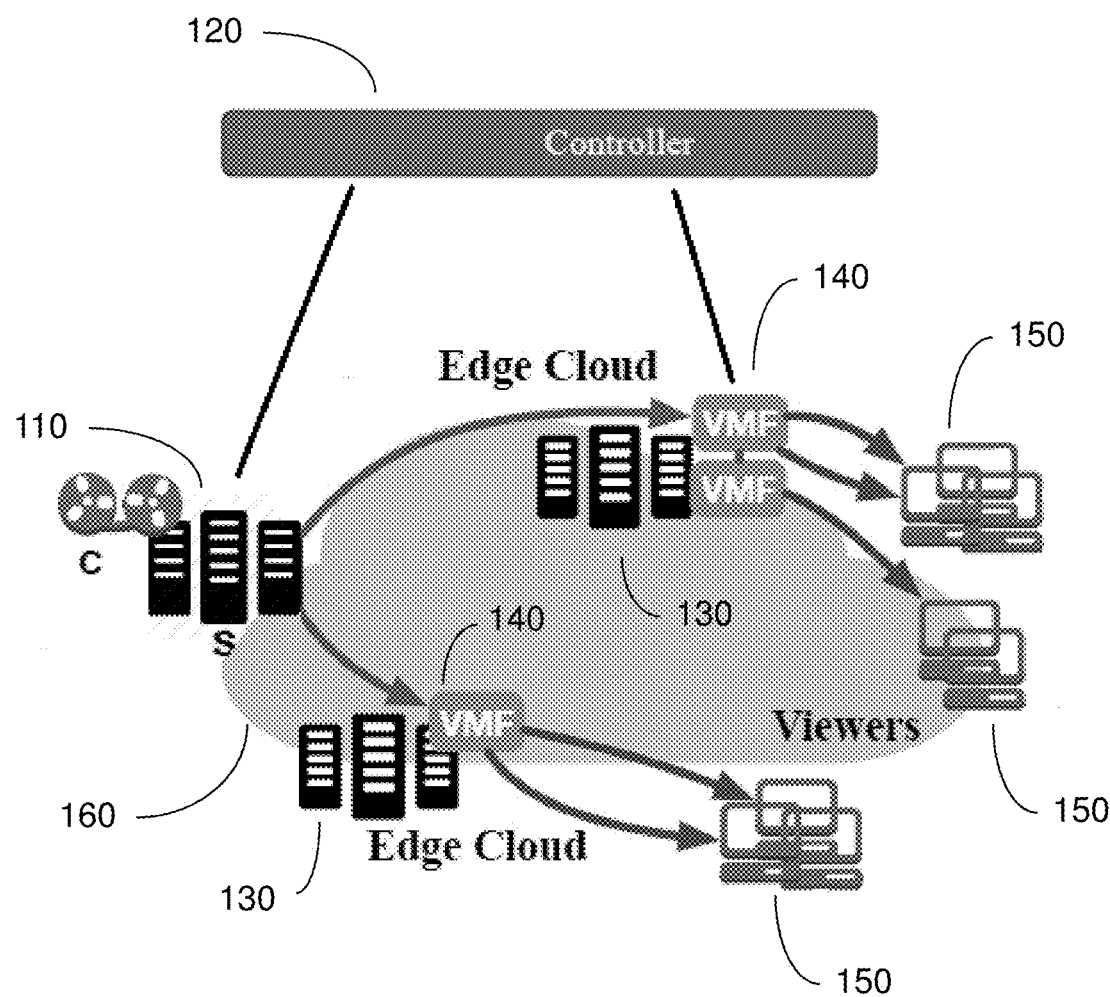
FIG. 1 depicts an illustrative embodiment of a system for transport layer network service for live content broadcasting.

The subject disclosure describes, among other things, illustrative embodiments for a virtual processing system initiating a first streaming session with a content streaming server to receive content data, creating a first transport connection with a viewer streaming the content data in a second streaming session with the content streaming server by imitating a transport connection of the content streaming server with the viewer, creating a second transport connection with the content streaming server by imitating a transport connection of the viewer with the content streaming server, splitting the first streaming session between the content streaming server and the viewer, and streaming the content data to the viewer. Other embodiments are described in the subject disclosure.

One or more aspects of the subject disclosure include a cloud based network, comprising: a content streaming server that delivers content data to a viewer in a first streaming session, a central controller, and a plurality of edge nodes, each edge node including a processing system including a processor and a memory that stores executable instructions that, when executed by the processing system, facilitate performance of operations. The operations include launching a virtual machine responsive to receiving an instruction from the central controller, initiating, by the virtual machine, a second streaming session with the content streaming server to receive the content data, creating a first transport connection with the viewer by imitating a transport connection of the content streaming server with the viewer, creating a second transport connection with the content streaming server by imitating a transport connection of the viewer with the content streaming server, splitting, by the virtual machine, the first streaming session between the content streaming server and the viewer, and streaming, by the virtual machine, the content data to the viewer.

One or more aspects of the subject disclosure include a machine-readable storage medium, comprising executable instructions that, when executed by a virtual processing system including a virtual processor, facilitate performance of operations, comprising: initiating a first streaming session with a content streaming server to receive content data; creating a first transport connection with a viewer streaming the content data in a second streaming session with the content streaming server by imitating a transport connection of the content streaming server with the viewer; creating a second transport connection with the content streaming server by imitating a transport connection of the viewer with the content streaming server; splitting the first streaming session between the content streaming server and the viewer; and streaming the content data to the viewer.

One or more aspects of the subject disclosure include a method, comprising: receiving, by a controller in a network, the controller comprising a processing system including a processor, a register viewer request from a content streaming server, wherein the content streaming server delivers content data to a viewer identified in the register viewer request via a first streaming session; selecting, by the controller, an edge node in a plurality of edge nodes in the network; routing, by the controller, a transport connection of the first streaming session through the edge node; sending, by the controller, instructions to the edge node to prepare a virtual machine; sending, by the controller to the virtual machine, transport information of the transport connection of the first streaming session, wherein the virtual machine initiates a second streaming session with the content streaming server to receive content data, creates a first transport connection with the viewer by imitating a transport connection with the content streaming server, and creates a second transport connection with the content streaming server by imitating a transport connection with the viewer; and returning, by the controller, responsive to a readiness indication provided by the virtual machine, a notification to the content streaming server identifying the virtual machine.

Recently, major ISPs and cloud vendors have been investing heavily on developing integrated edge clouds. These edge clouds are deployed close to users and can provision virtual edge resources elastically from a centralized platform. Cloud vendors and CDNs have proposed various methods to enhance the coordination between their data centers and edge resources.

Today, most live broadcasting systems rely on CDN-based architectures to deliver live streams globally. By relaying the live content over one or multiple reflector sites, an overlay multicast tree is created to pass data from the origin content server to the edge servers in the regional data centers, which serve viewers directly through either Hyper-Text Transport (HTTP) or Real-Time Messaging (RTMP) protocols. Since the capacity and the egress bandwidth of each regional server can be very limited, most commercial streaming systems rely on the elasticity of the data center to handle varying traffic. Some systems can provision just enough server resources to handle daily traffic and rely on the assistance of other CDN providers in the case of overflow, while others have to prepare for the worst case to maintain consistent experience for all viewers.

Disclosed is a transparent network service to allow streaming servers such as CDN servers to seamlessly leverage ISP edge cloud resources for broadcasting live content. The system can elastically scale the serving capacity of CDN servers by integrating Virtual Media Functions (VMF) in VMs running in edge nodes in the cloud-based network to accommodate flash crowds for very popular content. The system introduces application layer changes for streaming service providers and is completely transparent to end users. The system can increase CDN server capacity by many multiples, and can effectively accommodate highly dynamic workloads with an improved service quality. Compared with other live broadcasting solutions, the system offers several distinct features.

Centralized Infrastructure Scaling.

Instead of pre-provisioning VMFs, the system has a centralized controller to deploy VMFs on demand and optimize delivery paths in real-time with the global view of content sources, viewer groups, network, and cloud resources.

Transparency and Compatibility.

The system includes an ISO layer-4 (Transport Control Protocol (TCP)) service and can support any layer-7 streaming applications. The system provides a server implementation with application program interfaces (APIs) compatible with standard streaming protocols. The system can be applied with no modification to the viewer, i.e., client side, applications made for streaming. The system is also compatible with any CDN optimization technique.

FIG. 1 depicts an illustrative embodiment of a system for transport layer network service for live content broadcasting. In this embodiment, the system 100 comprises a streaming server 110, a controller 120, edge nodes 130 comprising distributed VMFs 140, and multiple viewers 150 that are requesting the same live content from server 110 over a network 160. In system 100, the streaming server 110 can serve each viewer 150 directly via an individual transport session. A transport session is defined as the transport layer connection through which all session dependent signaling messages and live content data are delivered. For most popular live streaming protocols (i.e., RTMP, HTTP Live Streaming (HLS)), the transport session refers to an established TCP connection. In an embodiment, the system can be easily modified to serve User Datagram Protocol (UDP) based streaming protocols, such as Real-time Transport Protocol (RTP)/RTP Control Protocol (RTCP). Upon each viewer access, server 110 sends the controller 120 a request that contains detailed transport information of the established session (address and port of both server and viewer), along with the ID of the live content requested by the viewer. If the controller 120 assigns a VMF 140 in response to the request, the streaming server 110 sets up a footprint session with the assigned VMF 140, if such a footprint session does not already exist. A footprint session is defined as a special transport session between streaming server 110 and a VMF 140. Once a footprint session is established, the streaming server 110 only sends one copy of live content data to the footprint session, and only sends session-dependent signaling messages to corresponding transport sessions. A VMF 140 is essentially a function between the transport sessions traversing through the VMF. The VMF 140 can detect and intervene (i.e., hijack) any transport session between streaming server 110 and viewers 150.

After the footprint session is established, the VMF 140 is responsible for replicating and injecting content data from the footprint session to the hijacked transport sessions. From the viewer 150 perspective, there is no knowledge of the existence of any VMFs. The viewer 150 receives all the signaling and data packets from the transport session set up with the streaming server 110 as if they were sent from the streaming server 110.

The controller 120 has these responsibilities. First, controller 120 tracks status information including evolving viewer demands, service quality, and resource availability, and interacts with the edge clouds to strategically deploy VMFs 140 at optimized locations based on any of the tracked status information, proximity to viewers, available resources or the like. Second, given the information in the server request, the controller 120 determines which VMF 140 to be assigned to assist each transport session.

Note that: the streaming server 110 can detect a VMF failure or sessions experiencing poor performance through the signaling messages received from the transport sessions. In an embodiment, failure handling can also be done by the controller to simplify streaming server in a large-scale deployment. When a failure event is detected, the streaming server 110 terminates the affected transport sessions. Typically, in client implementation, the disconnected viewers would re-initiate new sessions with the server. The streaming server 110 has the option to serve them directly or through other available VMFs 140. VMFs affected by an upstream VMF failure are treated alike.

The scope of the system facilitates the collaboration between CDN and ISP. Such CDN-ISP collaboration only exists nowadays for large content and CDN providers who are capable of deploying customized server hardware to the ISP edge. In academia, NetPaaS proposes to share ISP information with CDN to optimize user-to-server assignments and server allocation. Different from these infrastructure sharing and information sharing approaches, the system demonstrates a new way of collaboration: providing a network service to allow CDN Provider or Content Provider servers to seamlessly leverage ISP edge resources to handle extreme viewer dynamics.

TCP session hijacking was originally developed as a penetration technique to take over a connection between the server and the client to eavesdrop or intervene the connection on behalf of the server or the client. Recently, with the advance of Network Function Virtualization (NFV), transparent TCP proxies witness growing popularity. Through session hijacking, transparent proxies can perform various functionalities without disrupting an existing TCP connection or any application running on it. Various transparent HTTP proxies such as Squid can leverage transparent TCP proxying to deliver cached content to clients on behalf of the server behind an established HTTP session. The system utilizes TCP session hijacking to seamlessly migrate users to a VMF.

In an embodiment, the controller communicates with VMFs and streaming servers through RPC calls. In an embodiment, VMFs are deployed on individual virtual machines (VMs). In an embodiment, session hijacking and content injection logic are implemented using Netfilter, which injects content from a streaming session to the second transport session and relays the signaling messages between two transport sessions transparently. In an embodiment, the RTMP enabled Nginx web server system is used for the streaming server. The RTMP protocol is currently a popular choice among live content providers such as Twitch and Facebook Live. A lightweight streaming plugin to the Nginx source code is attached to the server to subscribe to system services on the server side. All viewers are off-the-shelf video players that support RTMP streaming.

The system can leverage different techniques to steer any transport session through an assigned VMF. The controller (managed by an ISP) can boot VMFs at the ISP provider edge (PEs) as PE components similar to a virtual firewall. When a transport session traverses the PE to reach the backbone network, the VMF has the chance to serve the session as an intermediary for the streaming server (i.e., as a middlebox). Alternatively, if no VMF is available on the path, the ISP can configure IP tunnels or interact with CDN controllers to set up paths between any anchor points along the default routes and the VMFs. By dynamically mapping sessions to particular tunnels or paths, live sessions can be routed through the assigned VMFs. In an embodiment, OpenFlow is used to setup paths between the streaming server and the VMFs, to steer the sessions.

Figure 2:
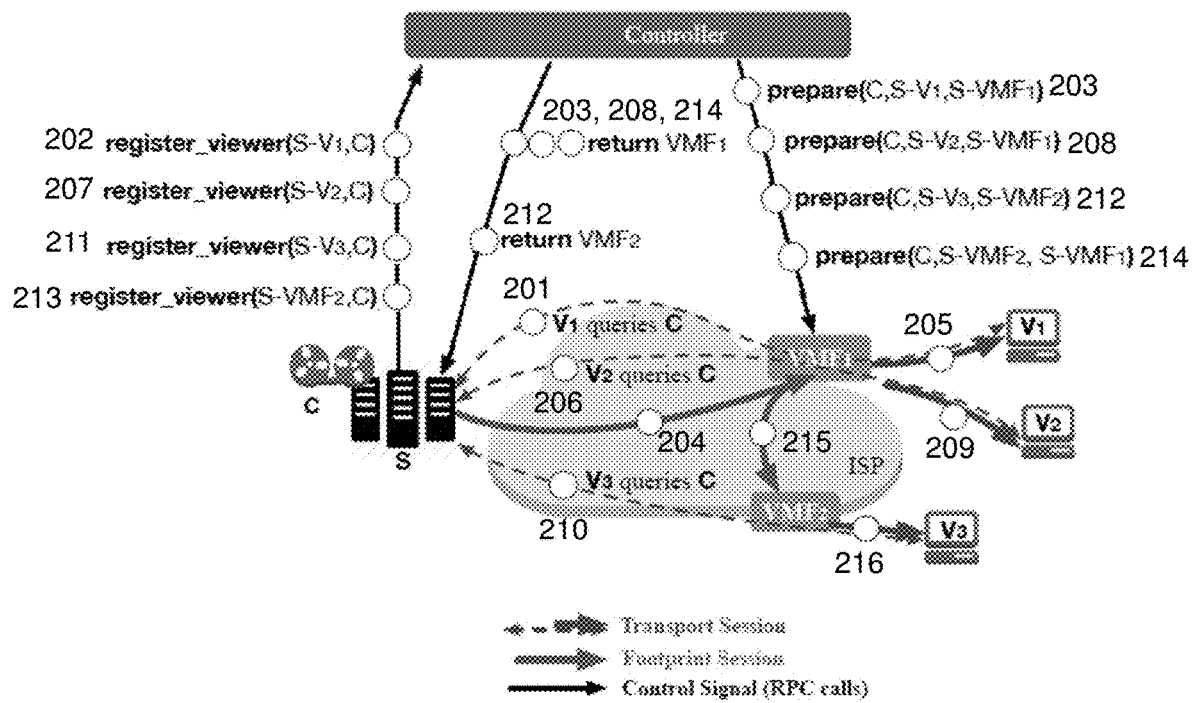
FIG. 2 is a connection flow diagram that depicts an illustrative embodiment of a method performed by a system for transport layer network service live content broadcasting.

FIG. 2 is a connection flow diagram that depicts an illustrative embodiment of a method 200 performed by system 100. Contrary to the illustration in FIG. 2, initially there is no viewers or VMFs. The first viewer V1 that appears, as shown in FIG. 2, initiates a query via a transport session connection for live content C available at the streaming server S. In step 201, a transport session connection S-V1 between S and V1 is established using an application layer protocol. In step 202, the streaming server S sends a register_viewer request to the controller carrying the transport information of S-V1 and the content ID for content C.

In step 203, the controller decides to assign VMF1 for this session. The controller prepares VMF1 for streaming by: a) routing the transport session traffic of S-V1 through VMF1; b) providing the transport information of S-V1 to VMF1 for hijacking; and c) informing VMF1 to expect content C from S. A prepare call from the controller to the helper VMF carries three arguments: the content ID, the targeting transport session, and the helper footprint session. Once VMF1 is ready, the controller notifies S that VMF1 is assigned to session S-V1, i.e. return VMF1.

In step 204, upon receiving such notification, the streaming server S sets up the footprint session S-VMF1 and starts sending content through S-VMF1.

In step 205, VMF1 injects the received data to session S-V1. Note that S does not block to wait for VMF1 to get ready. After making the register_viewer request, S may start streaming with V1 using session S-V1. S later switches to sending only signaling packets through S-V1 when the footprint session S-VMF1 is ready. This switching is explained in more detail in connection with FIG. 4 below.

In step 206, when a second viewer V2 queries the same content C, the transport session S-V2 is established. In step 207, the register_viewer request is sent to the controller. In step 208, the controller selects VMF1 and VMF1 is prepared to assist V2 as well. In this case, since the footprint session S-VMF1 is already active, in step 209, VMF1 can replicate the received content data and inject to both S-V1 and S-V2.

In step 210, a third viewer V3 queries content C from server S. In step 211, S registers viewer V3 with controller. In step 212, the controller assigns V3 to a different VMF, VMF2.

When setting up the footprint session S-VMF2, in step 213, S treats VMF2 the same way as a normal viewer, and send a register_viewer request to the controller. In step 214, the controller assigns VMF1 to help prepare VMF2. In this case, data from the footprint session S-VMF1 is directly injected to the new footprint S-VMF2 in step 215.

Subsequently, in step 216, VMF2 injects the data again into the session S-V3.

Figure 3:
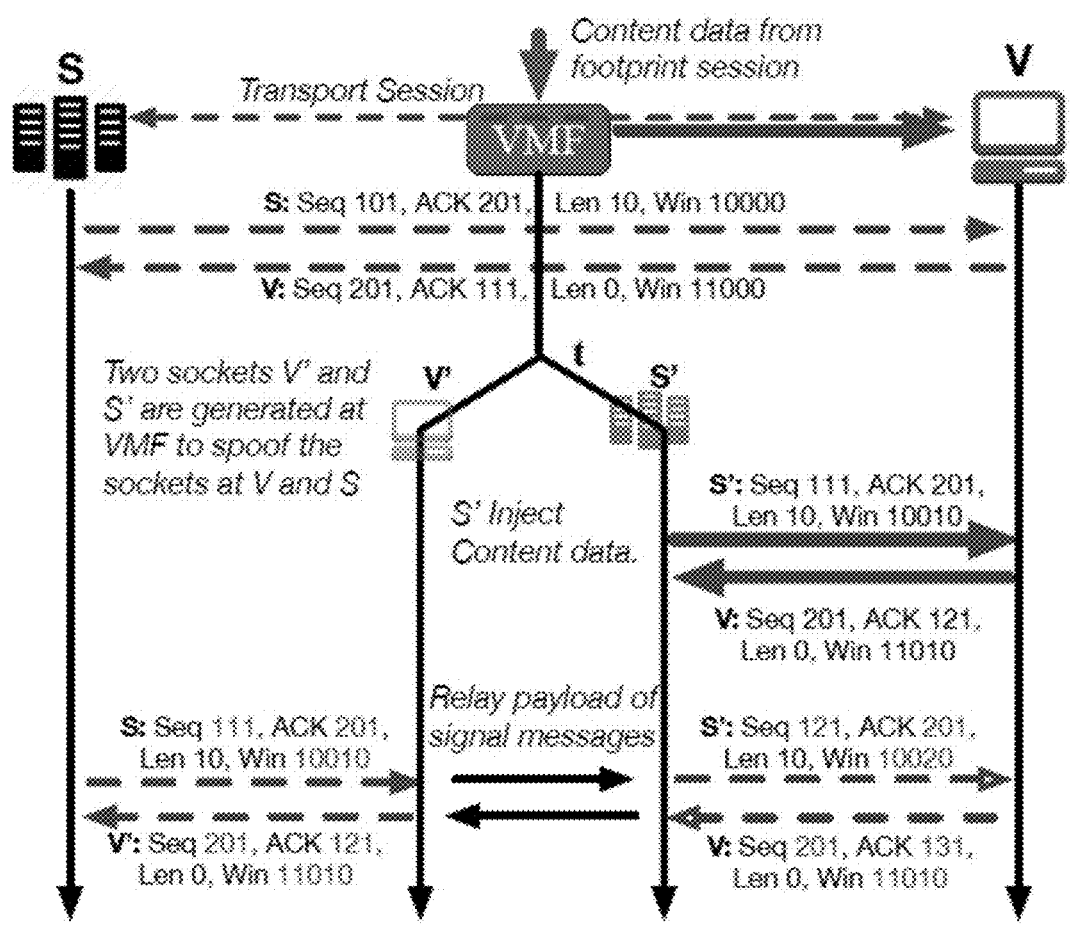
FIG. 3 is a flow diagram of a system for transport layer network service for live content broadcasting that depicts an illustrative embodiment of hijacking a session.

FIG. 3 is a flow diagram 300 of a system for transport layer network service for live content broadcasting that depicts an illustrative embodiment of hijacking a session. Flow diagram 300 illustrates the system hijacking a session and injecting content packets received from the footprint session into the transport sessions, which are all TCP connections. FIG. 3 illustrates one example of hijacking a transport session between S and V. In an embodiment Netfilter hooks are implemented in a kernel module that can access any packet chained through VMF. A user-space program listens to RPC calls from the controller. Upon receiving a prepare call, the program informs the kernel module to transparently sniff the packets of the transport session that should be hijacked, where the TCP session states, such as SEQ/ACK numbers and timestamps, can be tracked. At time t, VMF creates (i.e., spoofs) two TCP sockets matching those currently existing for S and V, and then breaks the original transport session into two subsessions. The kernel module spoofs SYN-ACKs from V to S' and S to V' to fake the handshake for S' and V', respectively. In particular, the TCP socket S' at the VMF facing the viewer spoofs the socket S, while V' facing the server spoofs socket V. Through the spoofed S', VMF can inject content data received from the footprint session on behalf of the streaming server. The payloads of the signaling packets between S and V are relayed between V' and S'. After hijacking, VMF applies constant offsets to SEQ/ACK numbers for the TCP sessions, modifies source/destination addresses and set local timestamps to proxy packets from the original transport session to the two subsessions and vice-versa. Consequently, VMF only maintains in the order of tens of constants for each session with no time-varying states. The two subsessions work independently to handle transport functions such as congestion control and retransmission.

Modern content services are generally encrypted from service provider to end users. In an embodiment, one basic assumption is that the content provider owns or share secure domains with the VMFs. Therefore, encryption can be offloaded to VMFs. In such an embodiment, transport layer security (TLS) can be implemented in the VMF for content encryption. To accommodate bandwidth variabilities for different viewers, control packets for VMFs can be extended to adaptively select appropriate bitrates for individual users.

The centralized control logic may include code that carefully engineers the placement of VMFs, which can effectively reduce network traffic and provide better streaming quality to viewers. Optimized deployment of VMFs may depend on the geo-locations of the streaming servers, the clouds and the viewers, the network topology and utilization, available cloud resources. Furthermore, mapping user requests to deployed VMFs affect the service quality. In an embodiment, joint optimization of VMF placement, session mapping, and fine-grain traffic engineering is also an achievable goal.

Local Area Network (LAN) Evaluation

Figure 4:
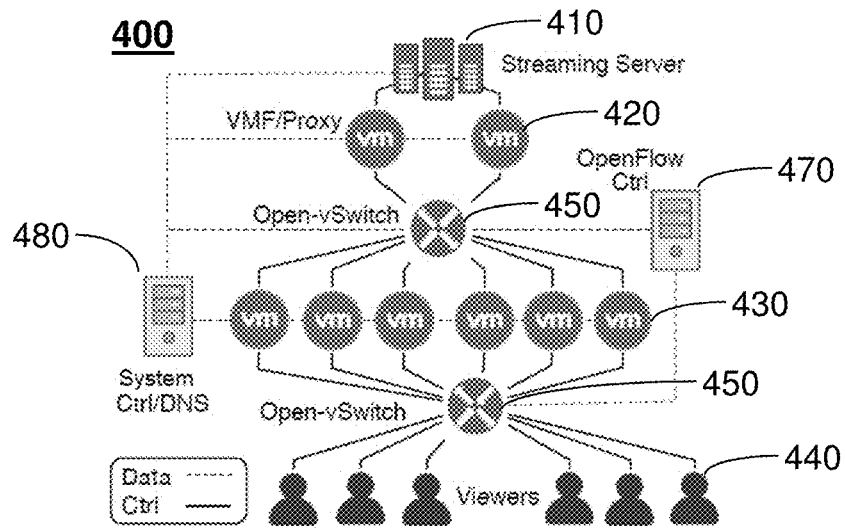
FIG. 4 is a block diagram that illustrates a logical topology of a local area network testbed.

FIG. 4 is a block diagram that illustrates a logical topology of a LAN testbed 400. The testbed hardware includes four DELL R730 servers. As shown in FIG. 4, one streaming server 410 is deployed in the network. There are two tiers of VM-based relay nodes 420, 430 in the LAN testbed 400, each of which can be configured as a pure forwarding hop, a proxy server, or a VMF in different test scenarios. Viewers 440 are generated at Docker containers with different IPs or TCP ports. Two Open vSwitches (OVS) 450 connect different tiers. Through the OpenFlow controller 470, various routes are configured between the two tiers. There is an additional VM configured as the controller or a domain name server (DNS) 480.

Test Scenarios:

The LAN testbed 400 can be configured into three test scenarios to compare the system against different solutions:

Single Streaming Server:

Each relay node is a forwarding hop. This scenario serves as a benchmark of that viewers are directly served by the original content servers and/or CDN servers.

DNS-Based Proxying:

A fixed number of Nginx-RTMP proxy servers are deployed in the relay nodes. A dynamic DNS server is configured to load balance viewers to different proxy servers. A five-minute delay emulates the real world latency introduced by populating DNS updates. A viewer cannot switch between proxy servers while it is being served.

The System:

Viewers are initially served by the streaming server directly. When the live content becomes available on the VMF, the OpenFlow controller 470 routes the session through the VMF, which then hijacks the session and seamlessly injects content into the session on behalf of the server. VMFs can be dynamically booted or shutdown based on the user workloads.

Metrics:

When certain link becomes congested or certain VM gets overloaded, viewers experience high TCP retransmission rate and high jitter in received RTMP frames. Therefore, TCP goodput and average frame jitter are used as the metrics to evaluate QoE of viewers. Frame jitter is defined as the standard deviation of the inter-arrival time of frames. Some viewers are randomly selected and implemented using FFprobe to monitor per-frame statistics. All the other viewers are implemented using RTMPdump.

System Capacity Stress Test

In this test, the maximum system capacities of the system with VMFs enabled at all eight VMs and that of the single streaming server scenario are compared. Each virtual link is rate limited to 200 Mbps according to the typical VM network bandwidth in commercial clouds. 20 channels are generated with the same 480p 600 kbps Big Buck Bunny sample video. Viewers are randomly generated at different containers in this test.

Figure 5:
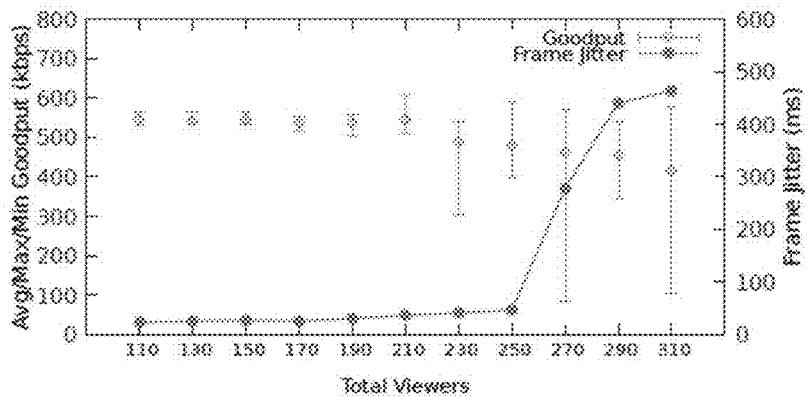
FIG. 5 is a graph that shows the frame jitter and goodput results for single streaming server.
Figure 6:
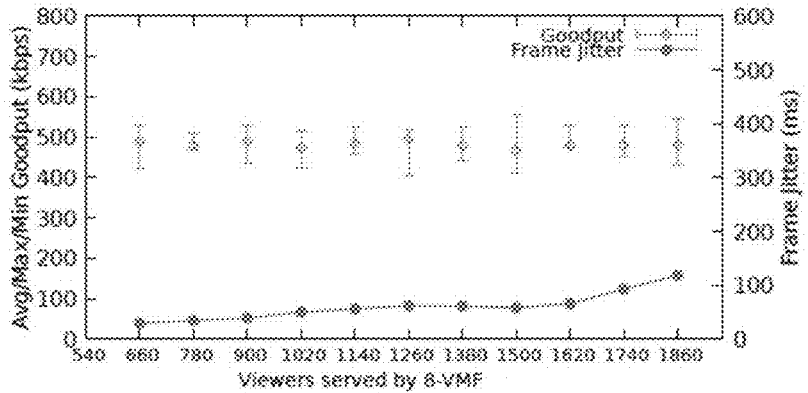
FIG. 6 is a graph that shows the frame jitter and goodput results for an eight-VMF system.

FIGS. 5 and 6 are graphs that show the frame jitter and goodput results for single streaming server and eight-VMF system, respectively. A single streaming server can support only up to 250 viewers. Beyond 250 viewers the video frame jitter increases significantly and the goodput decreases, leading to an unstable system. By contrast, an eight-VMF system supports up to 1,620 viewers with sub-100 ms frame jitter and no observable goodput degradation. Beyond 1,620 viewers, the jitter exceeds 100 ms due to the congestions in VMF egress bandwidth.

Individual VMF Performance

Figure 7:
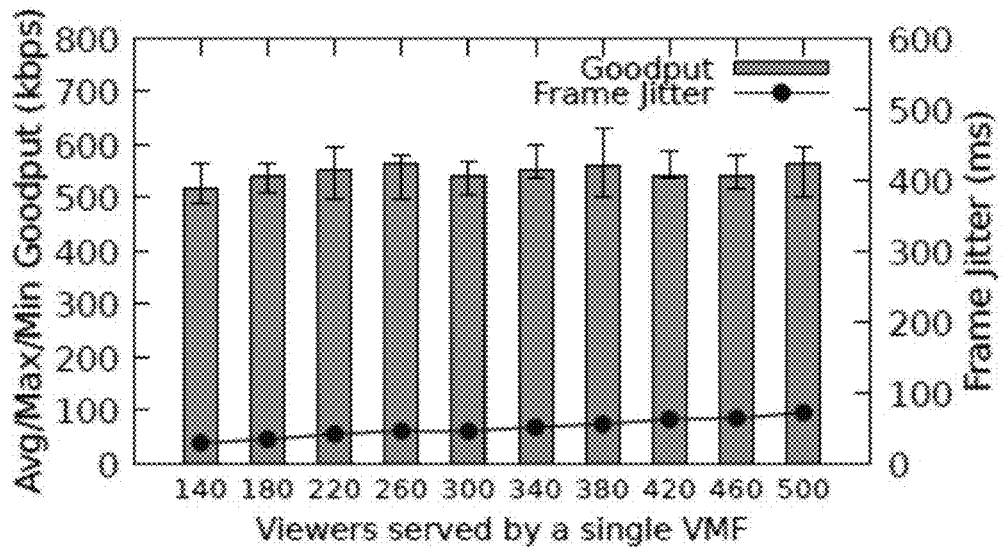
FIG. 7 is a bar chart that illustrates goodput and frame jitter from serving 500 viewers by a single VMF with one 480p channel.

A single VMF can support more viewers with a higher egress bandwidth. In this test, the egress bandwidth of a VMF is increased to 3.3 Gbps by accelerating OVS with DPDK. This setup mimics the real-world edge clouds that are close to viewers and have a high user-facing bandwidth. FIG. 7 is a bar chart that illustrates goodput and frame jitter as the system scales up to 500 viewers served by a single VMF with one 480p channel. The results show that a VMF can smoothly support all the viewers with 83 ms frame jitter and no observable loss of video rate.

Figure 8:
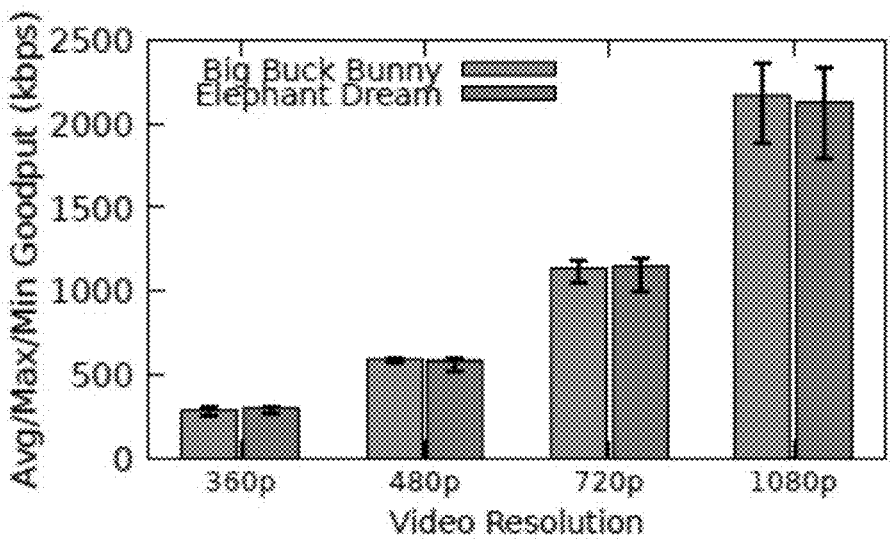
FIG. 8 is a bar chart that illustrates goodput from serving 500 viewers with two video sources.

FIG. 8 is a bar chart that illustrates goodput as the system scales up to 500 viewers with two kinds of video sources. At the 500-viewer workload, the two video sources (i.e. Big Buck Bunny and Elephant Dream) are tested with different resolutions and bitrates. The source bitrates for 360p, 480p, 720p and 1080p are 300 kbps, 600 kbps, 1200 kbps and 2400 kbps, respectively. The results illustrated in FIG. 8 show that a single VMF can safely support all 500 viewers with moderate bitrate for 360p/480p/720p video sources. Some viewers experience a higher rate variance for 1080p video while the average is moderate.

Adaptation to User Dynamics

In this test, the system response to dynamic user demands are evaluated. The system is compared against DNS-based proxy systems. A 100 min user trace collected from Facebook-Live is scaled to generate the workload. The streaming server cyclically plays a 480p Big Buck Bunny sample video with a length of 5 min 30 sec. Based on the geo-locations of the viewers in the real traces, each viewer is mapped to one of the containers. Since the trace does not contain the service time of individual viewers, the service time is configured to be exponentially distributed with a mean of 10 min. All the links are configured to 200 Mbps. For the DNS scenario, a two-proxy-server (Proxy-2) system and an over-provisioned four-proxy-server (Proxy-4) system are created. Every five minutes, the mapping of viewers to proxy servers are re-calculated according to the load of each proxy server in the previous five-min time slot. The updated user mapping will be applied in the next time slot. The system starts with one VMF serving up to 350 concurrent viewers. For every 350 more viewers, a new VMF is booted. For a fair comparison, the system can boot up to four VMFs. A viewer is always chained and served by the VMF with the least load when it accesses the service.

Figure 9:
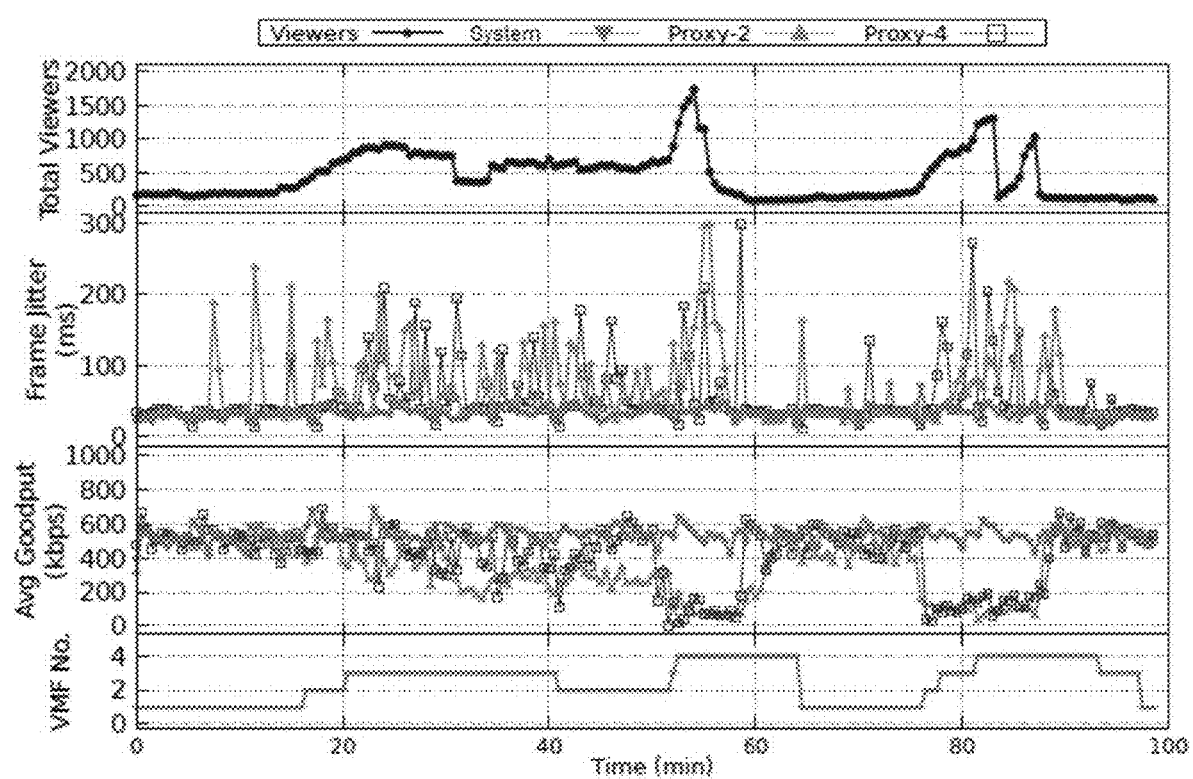
FIG. 9 is a graph illustrating number of viewers and VMFs, and comparing average frame jitter and goodput of the system, Proxy-2, and Proxy-4.

FIG. 9 is a graph illustrating a total number of viewers and VMFs, and comparing average frame jitter and goodput of the system, a Proxy-2 system, and a Proxy-4 system over a 100 minute time span. Both Proxy-2 and Proxy-4 experience high frame jitter since the DNS based mapping cannot keep up with the user dynamics Even at lower workloads during the range 0-20 min, Proxy-2 and Proxy-4 experience sporadic jitter bursts due to unbalanced user workloads. With overprovisioned proxy servers, Proxy-4 performs slightly better than Proxy-2 with fewer jitter bursts. However, Proxy-4's responses to flash crowds at 18 min, 52 min and 74 min are still bad. For comparison, the system maintains a low frame jitter and a smooth goodput throughout the test. With the on-the-fly session migration, VMFs achieve close to the optimal load balancing. The frame jitter increases by a few tens of milliseconds at 52 min and 74 min when viewers are served by the streaming server before new VMFs become ready. The result also shows that the system can elastically scale VMFs based on an increased demand for content data and destroy VMFs in response to a reduction in demand for the content data. Note that VMFs are not shut down immediately as the workload shrinks (e.g., at 32 min and 50 min) until all active viewers served by the VMFs fade out. To better show the elasticity of the system, each viewer in our test is configured to leave in 20 min. Theoretically, the system can support a seamless consolidation of sessions from excessive VMFs, which is similar to migrating session from the streaming server to a VMF. User consolidation is also possible.

WAN Evaluation

Figure 10:
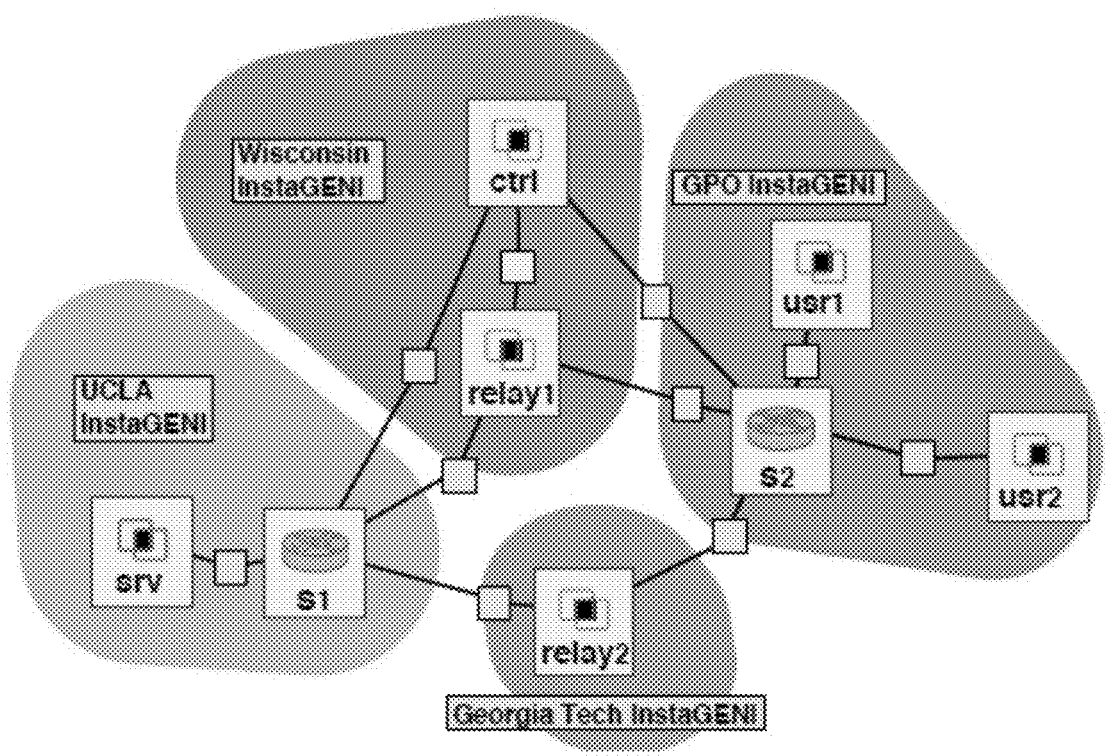
FIG. 10 is a block diagram illustrating a WAN testbed includes a streaming server, multiple viewers, two VMFs, and the controller deployed across four federal states.

To demonstrate system performance in real-world wide area networks, a small-scale prototype is deployed in a GENI network. FIG. 10 is a block diagram illustrating a WAN testbed includes a streaming server, multiple viewers, two VMFs, and the controller deployed across four federal states. Two data paths for live content delivery are configured, where the server machine "srv" at UCLA broadcasts to viewers at "usr1" and "usr2" in Boston GPO via "relay1" at Wisconsin or "relay2" at Georgia Tech. The end-to-end bandwidth from "srv" to "usr1" or "usr2" through the two data paths is only around 10.5 Mbps. The bandwidth from "relay1/2" to "usr1/2" is less than 49.3 Mbps. To accommodate the capacity, only up to a total of 20 viewers are generated at "usr1/2" and stream only one 256 kbps sample video from "srv."

Service Latency

The service latency of both the system and the proxy server solutions are measured. Two kinds of service latency are evaluated: the average end-to-end delivery lag between when a frame is sent by the server and when it is received at a viewer; and the startup latency between when a viewer requests the content and when the first video frame is received. A total of 20 viewers are generated at "usr1" and "usr2" in the GPO site in Boston. Ten of the viewers at "usr1" are served by a VMF at "relay1" and the other ten at "usr2" are served by a VMF at "relay2." For comparison, the single-streaming-server scenario (i.e. all viewers are served by the server directly) is tested. The proxying scenario (i.e. "relay1" and "relay2" configured as proxy components of three scenarios) are listed in Table 1:

| Setup | Itemize | Min/Avg/Max (ms) |
|---|---|---|
| Directly served S(Server)-V(Viewers) | E2E delivery lag | 43.52/60.89/98.70 |
| | Total startup | 795/1022/2072 |
| The System S-VMF-V | E2E delivery lag | 57.36/62.82/107.14 |
| | E2E delay | 53.35/54.84/69.20 |
| | Total startup | 811/1080/1671 |
| | RTMP handshake | 680/850/1565 |
| | RPC calls | 65/176/260 |
| | Session hijacking | 143/257/698 |
| Proxy-based S-S-V | E2E delivery lag | 84/86.67/340.17 |
| | E2E delay | 53.24/56.40/77.19 |
| | Total startup | 343/605/2017 |

Table 1 reveals that the system only introduces 1.93 ms additional delivery lag on average compared to directly serving clients from the server. Most of the delivery lag is contributed by the end-to-end delay (E2E delay) from the west coast to the east coast. This greatly outperforms proxy-based solution which introduces 25.78 ms for a single proxy relay. Since proxy server runs at the application layer and implements streaming protocol logic, the latency is higher than VMF which purely duplicates and injects frames to viewers. Regarding start-up latency, the system is comparable to the single streaming-server setup. Most start-up latency is contributed by RTMP session negotiation, while the add-on logics of the system, such as RPC calls or session hijacking, add little to the total startup latency. The proxy-based solution enjoys the fastest start-up latency because the session negotiation is between the viewers and the proxy in their proximity. In practice, the system will work with CDN streaming servers in edge clouds that are much closer to viewers than the WAN testbed, and therefore will achieve much shorter start-up latency. Meanwhile, the worst-case start-up latency of proxy-based-solution is much longer than the system. When the content is not yet available at the proxy, the proxy based solution requires extra time to stream from the origin server and the viewers can be blocked before the contents are ready. In contrast, the system does not block service even when VMFs are not yet ready.

VMF Failover

A second test demonstrates how the system reacts to a VMF failover. Initially, ten viewers are served by a VMF at "relay1" and transport sessions traverse through "srv-s1-relay1-s2-usr1." At 20 sec, the VMF at "relay1" is shutdown. Since viewers are not aware of VMFs, the affected viewers immediately try to re-connect and are then served by "srv" directly. The controller detects that the VMF at "relay1" goes down, and controls the switches "s1" and "s2" to chain the user sessions through "relay2." At 40 sec, the VMF at "relay2" becomes ready, and seamlessly hijacks the sessions and serves the viewer on behalf of the server.

Figure 11:
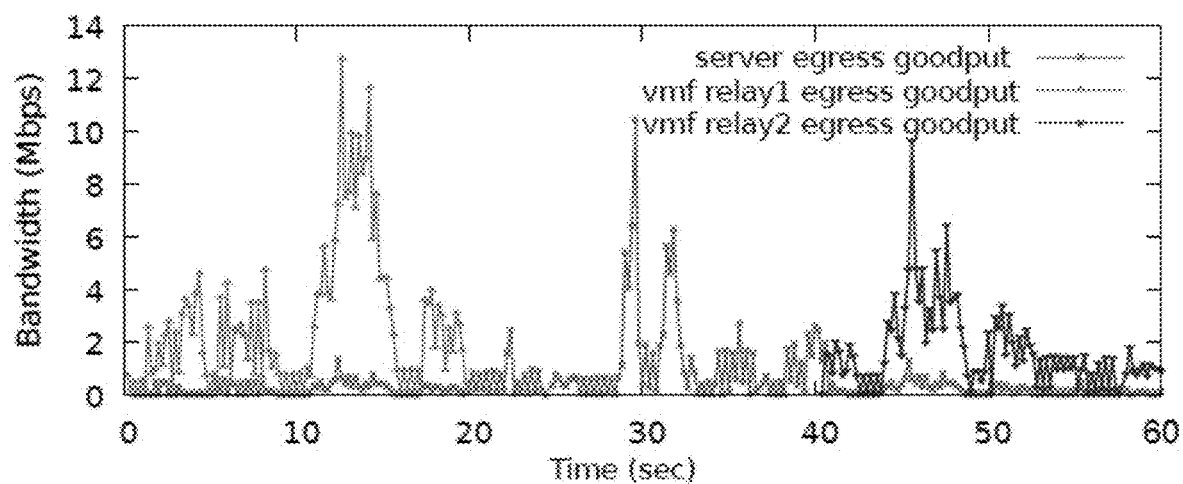
FIG. 11 illustrates the egress goodput bandwidth of the server and VMFs during VMF failure.

FIG. 11 illustrates the egress goodput bandwidth of the server and VMFs during VMF failure. As illustrated, the system is able to swiftly failover between VMFs in case of VMF failure or regional bandwidth congestion for certain viewers. The average down time between VMF at "relay1" goes down and all ten viewers being reconnected to the server is 1,436 ms, which is mostly contributed by re-negotiating RTMP channels. The handover from server to VMF at "relay2" introduces no down time or TCP reconnect. Therefore, the system outperforms DNS or redirection-based solutions in case of site failures, which takes five minutes or more to populate user mapping. Although the failover may not be as seamless as P2P solutions, VMFs are relatively reliable server based entities, which do not introduce as many failures/churns as in P2P systems. Meanwhile, VMF failure recovery can be further enhanced by higher level client-side application solutions, such as buffering or multi-homing.

While for purposes of simplicity of explanation, the respective processes are shown and described as a series of steps or blocks in FIGS. 2-3, it is to be understood and appreciated that the claimed subject matter is not limited by the order of the steps or blocks, as some steps may occur in different orders and/or concurrently with other steps from what is depicted and described herein. Moreover, not all illustrated steps or blocks may be required to implement the methods described herein.

Figure 12:
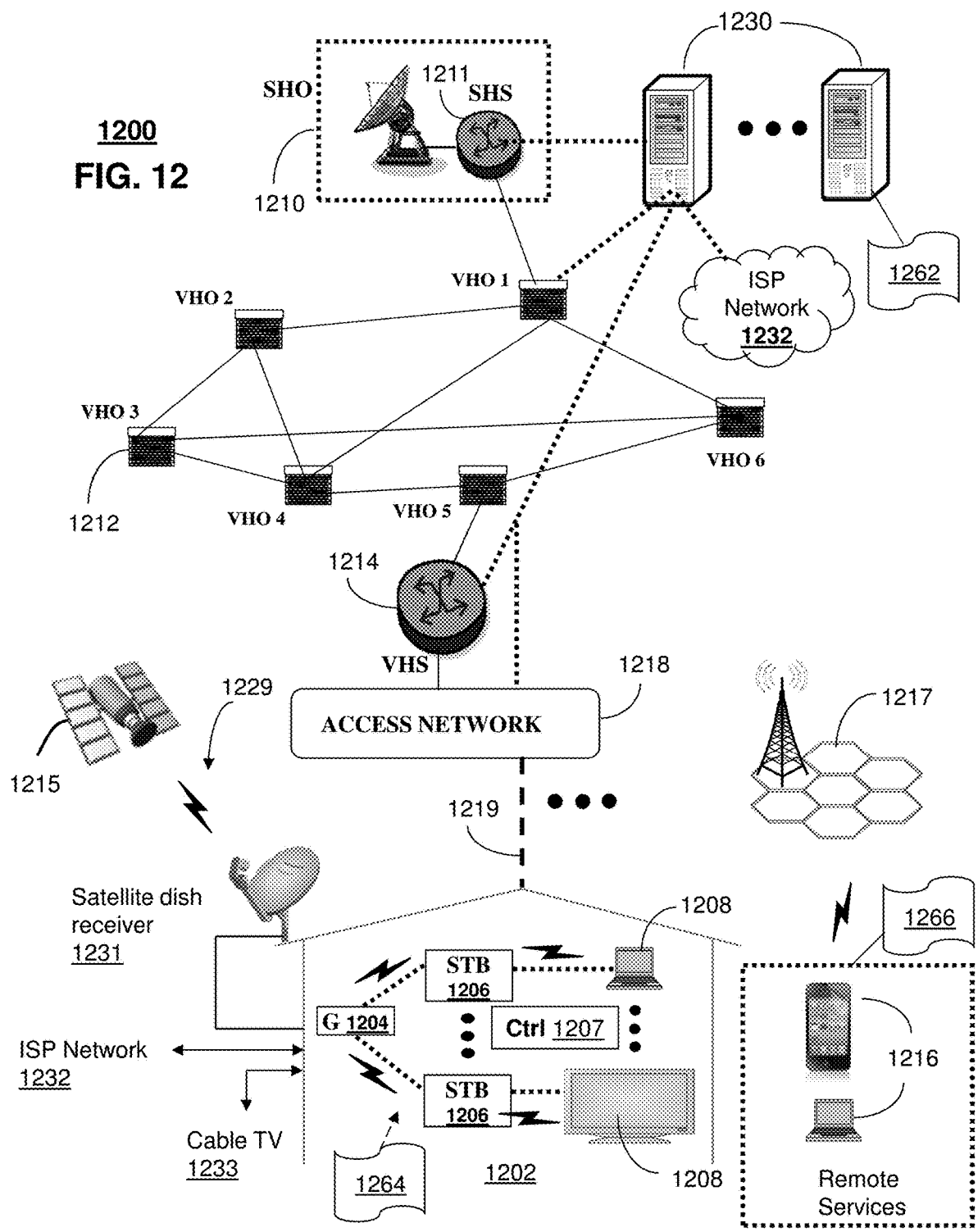
FIGS. 12-13 depict illustrative embodiments of communication systems that provide media services in a system for transport layer network service for live content broadcasting.

FIG. 12 depicts an illustrative embodiment of a communication system 1200 for providing various communication services, such as delivering media content. The communication system 1200 can represent an interactive media network, such as an interactive television system (e.g., an Internet Protocol Television (IPTV) media system). Communication system 1200 can be overlaid or operably coupled with system 100 of FIG. 1 as another representative embodiment of communication system 1200. For instance, one or more devices illustrated in the communication system 1200 of FIG. 12 may include a communication node comprising a processor that performs operations including intercepting a first streaming session directed to a viewer node of a plurality of viewer nodes without interrupting the first streaming session, wherein the first streaming session comprises live content data, and wherein the first streaming session is supplied by a content streaming server, initiating a second streaming session with the content streaming server to receive the live content data, creating a first replacement connection with the viewer node by imitating a connection of the content streaming server, creating a second replacement connection with the content streaming server by imitating a connection of the viewer node, splitting the first streaming session between the content streaming server and the viewer node of the plurality of viewer nodes responsive to obtaining a control packet over the second streaming session, and streaming the live content data to the viewer node.

In one or more embodiments, the communication system 1200 can include a super head-end office (SHO) 1210 with at least one super headend office server (SHS) 1211 which receives media content from satellite and/or terrestrial communication systems. In the present context, media content can represent, for example, audio content, moving image content such as 2D or 3D videos, video games, virtual reality content, still image content, and combinations thereof. The SHS server 1211 can forward packets associated with the media content to one or more video head-end servers (VHS) 1214 via a network of video head-end offices (VHO) 1212 according to a multicast communication protocol. The VHS 1214 can distribute multimedia broadcast content via an access network 1218 to commercial and/or residential buildings 1202 housing a gateway 1204 (such as a residential or commercial gateway).

The access network 1218 can represent a group of digital subscriber line access multiplexers (DSLAMs) located in a central office or a service area interface that provide broadband services over fiber optical links or copper twisted pairs 1219 to buildings 1202. The gateway 1204 can use communication technology to distribute broadcast signals to media processors 1206 such as Set-Top Boxes (STBs) which in turn present broadcast channels to media devices 1208 such as computers or television sets managed in some instances by a media controller 1207 (such as an infrared or RF remote controller).

The gateway 1204, the media processors 1206, and media devices 1208 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 1206 and subsystems of the IPTV media system for services such as video-on-demand (VoD), browsing an electronic programming guide (EPG), or other infrastructure services.

A satellite broadcast television system 1229 can be used in the media system of FIG. 12. The satellite broadcast television system can be overlaid, operably coupled with, or replace the IPTV system as another representative embodiment of communication system 1200. In this embodiment, signals transmitted by a satellite 1215 that include media content can be received by a satellite dish receiver 1231 coupled to the building 1202. Modulated signals received by the satellite dish receiver 1231 can be transferred to the media processors 1206 for demodulating, decoding, encoding, and/or distributing broadcast channels to the media devices 1208. The media processors 1206 can be equipped with a broadband port to an Internet Service Provider (ISP) network 1232 to enable interactive services such as VoD and EPG as described above.

In yet another embodiment, an analog or digital cable broadcast distribution system such as cable TV system 1233 can be overlaid, operably coupled with, or replace the IPTV system and/or the satellite TV system as another representative embodiment of communication system 1200. In this embodiment, the cable TV system 1233 can also provide Internet, telephony, and interactive media services. Communication system 1200 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1230, a portion of which can operate as a web server for providing web portal services over the ISP network 1232 to wireline media devices 1208 or wireless communication devices 1216.

Communication system 1200 can also provide for all or a portion of the computing devices 1230 to function as an edge node (herein referred to as edge node 1230). The edge node 1230 can use computing and communication technology to perform function 1262, which can include among other things, the session hijacking and chaining techniques described by methods 200-300 of FIGS. 2-3. For instance, function 1262 of edge node 1230 can be similar to the functions described for VMFs 140 of FIG. 1 in accordance with methods 200-300. The media processors 1206 and wireless communication devices 1216 can be provisioned with software functions 1264 and 1266, respectively, to utilize the services of edge node 1230. For instance, software functions 1264 and 1266 of media processors 1206 and wireless communication devices 1216 can be similar to the functions described for the viewers 150 of FIG. 1 in accordance with methods 200-300 of FIGS. 2-3.

Multiple forms of media services can be offered to media devices over landline technologies such as those described above. Additionally, media services can be offered to media devices by way of a wireless access base station 1217 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 13:
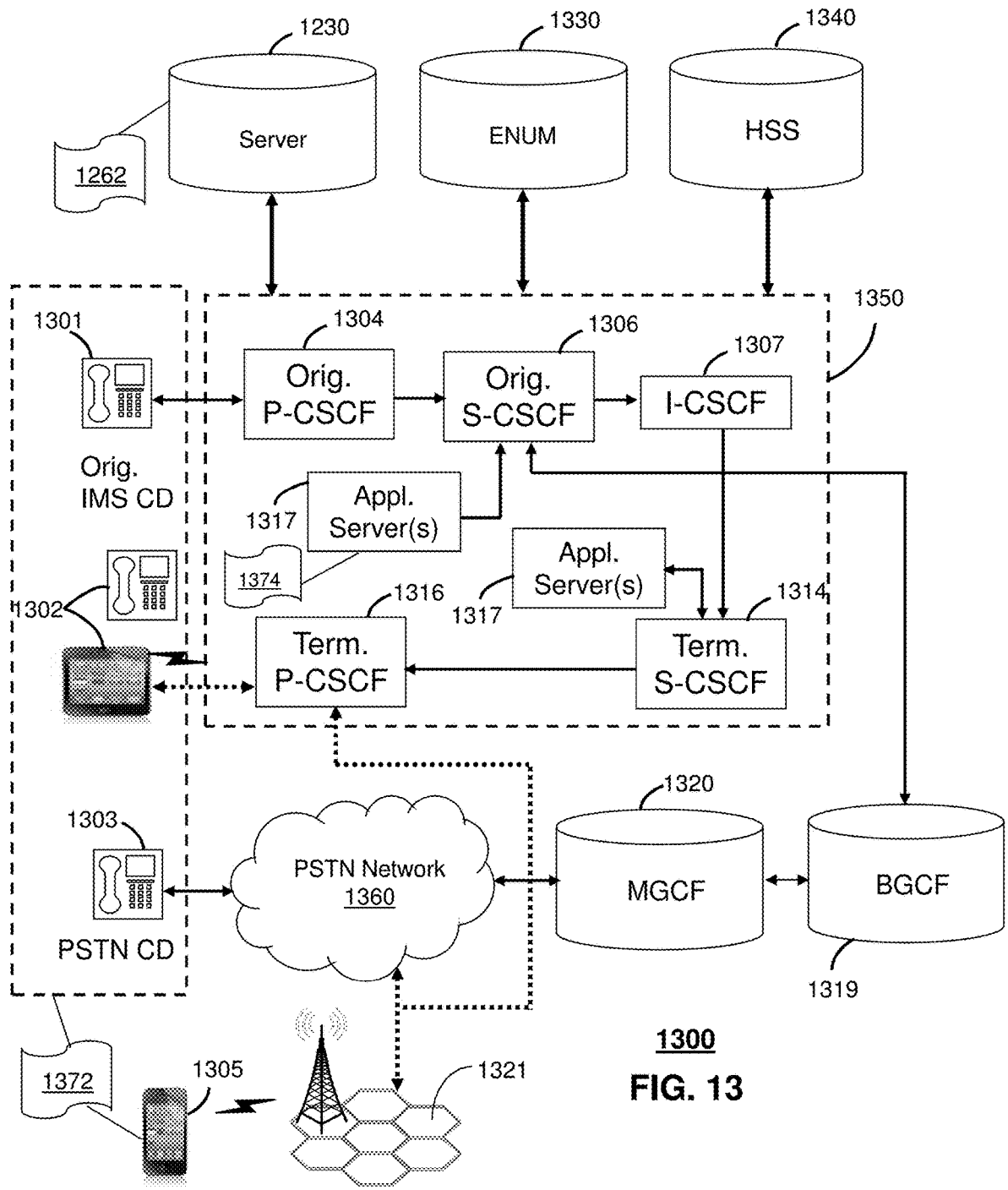

FIG. 13 depicts an illustrative embodiment of a communication system 1300 employing an IP Multimedia Subsystem (IMS) network architecture to facilitate the combined services of circuit-switched and packet-switched systems. Communication system 1300 can be overlaid or operably coupled with system 100 of FIG. 1 and communication system 1200 as another representative embodiment of communication system 1300. For instance, one or more devices illustrated in the communication system 1300 of FIG. 13 may include a communication node comprising a processor that performs operations including intercepting a first streaming session directed to a viewer node of a plurality of viewer nodes without interrupting the first streaming session, wherein the first streaming session comprises live content data, and wherein the first streaming session is supplied by a content streaming server, initiating a second streaming session with the content streaming server to receive the live content data, creating a first replacement connection with the viewer node by imitating a connection of the content streaming server, creating a second replacement connection with the content streaming server by imitating a connection of the viewer node, splitting the first streaming session between the content streaming server and the viewer node of the plurality of viewer nodes responsive to obtaining a control packet over the second streaming session, and streaming the live content data to the viewer node.

Communication system 1300 can comprise a Home Subscriber Server (HSS) 1340, a tElephone NUmber Mapping (ENUM) server 1330, and other network elements of an IMS network 1350. The IMS network 1350 can establish communications between IMS-compliant communication devices (CDs) 1301, 1302, Public Switched Telephone Network (PSTN) CDs 1303, 1305, and combinations thereof by way of a Media Gateway Control Function (MGCF) 1320 coupled to a PSTN network 1360. The MGCF 1320 need not be used when a communication session involves IMS CD to IMS CD communications. A communication session involving at least one PSTN CD may utilize the MGCF 1320.

IMS CDs 1301, 1302 can register with the IMS network 1350 by contacting a Proxy Call Session Control Function (P-CSCF) which communicates with an interrogating CSCF (I-CSCF), which in turn, communicates with a Serving CSCF (S-CSCF) to register the CDs with the HSS 1340. To initiate a communication session between CDs, an originating IMS CD 1301 can submit a Session Initiation Protocol (SIP INVITE) message to an originating P-CSCF 1304 which communicates with a corresponding originating S-CSCF 1306. The originating S-CSCF 1306 can submit the SIP INVITE message to one or more application servers (ASs) 1317 that can provide a variety of services to IMS subscribers.

For example, the application servers 1317 can be used to perform originating call feature treatment functions on the calling party number received by the originating S-CSCF 1306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1306 can submit queries to the ENUM system 1330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1307 to submit a query to the HSS 1340 to identify a terminating S-CSCF 1314 associated with a terminating IMS CD such as CD 1302. Once identified, the I-CSCF 1307 can submit the SIP INVITE message to the terminating S-CSCF 1314. The terminating S-CSCF 1314 can then identify a terminating P-CSCF 1316 associated with the terminating CD 1302. The P-CSCF 1316 may then signal the CD 1302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 13 may be interchangeable. It is further noted that communication system 1300 can be adapted to support video conferencing. In addition, communication system 1300 can be adapted to provide the IMS CDs 1301, 1302 with the multimedia and Internet services of communication system 1200 of FIG. 12.

If the terminating communication device is instead a PSTN CD such as CD 1303 or CD 1305 (in instances where the cellular phone only supports circuit-switched voice communications), the ENUM system 1330 can respond with an unsuccessful address resolution which can cause the originating S-CSCF 1306 to forward the call to the MGCF 1320 via a Breakout Gateway Control Function (BGCF) 1319. The MGCF 1320 can then initiate the call to the terminating PSTN CD over the PSTN network 1360 to enable the calling and called parties to engage in voice and/or data communications.

It is further appreciated that the CDs of FIG. 13 can operate as wireline or wireless devices. For example, the CDs of FIG. 13 can be communicatively coupled to a cellular base station 1321, a femtocell, a WiFi router, a Digital Enhanced Cordless Telecommunications (DECT) base unit, or another suitable wireless access unit to establish communications with the IMS network 1350 of FIG. 13. The cellular base station 1321 can operate according to common wireless access protocols such as GSM, CDMA, TDMA, UMTS, WiMAX, SDR, LTE, and so on. Other present and next generation wireless network technologies can be used by one or more embodiments of the subject disclosure. Accordingly, multiple wireline and wireless communication technologies can be used by the CDs of FIG. 13.

Cellular phones supporting LTE can support packet-switched voice and packet-switched data communications and thus may operate as IMS-compliant mobile devices. In this embodiment, the cellular base station 1321 may communicate directly with the IMS network 1350 as shown by the arrow connecting the cellular base station 1321 and the P-CSCF 1316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The edge node 1230 of FIG. 12 can be operably coupled to communication system 1300 for purposes similar to those described above. Edge node 1230 can perform function 1262 and thereby provide VMF services to the CDs 1301, 1302, 1303 and 1305 of FIG. 13 similar to the functions described for VMF 140 of FIG. 1 in accordance with methods 200-300 of FIGS. 2-3. CDs 1301, 1302, 1303 and 1305, which can be adapted with software to perform function 1372 to utilize the services of the edge node 1230 similar to the functions described for viewers 150 of FIG. 1 in accordance with methods 200-300 of FIGS. 2-3. Edge node 1230 can be an integral part of the application server(s) 1317 performing function 1374, which can be substantially similar to function 1262 and adapted to the operations of the IMS network 1350.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 14:
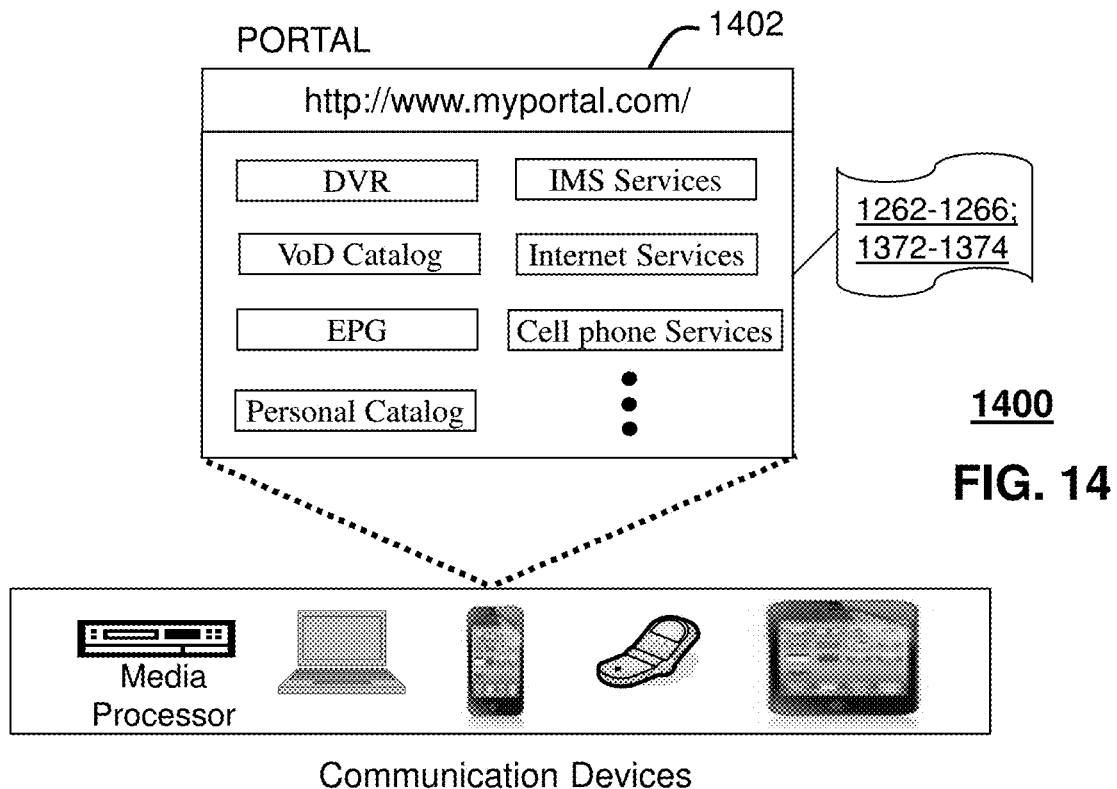
FIG. 14 depicts an illustrative embodiment of a web portal for interacting with the communication systems of a system for transport layer network service for live content broadcasting.

FIG. 14 depicts an illustrative embodiment of a web portal 1402 of a communication system 1400. Communication system 1400 can be overlaid or operably coupled with system 100 of FIG. 1, communication system 1200, and/or communication system 1300 as another representative embodiment of system 100 of FIG. 1, communication system 1200, and/or communication system 1300. The web portal 1402 can be used for managing services of system 100 of FIG. 1 and communication systems 1200-1300. A web page of the web portal 1402 can be accessed by a Uniform Resource Locator (URL) with an Internet browser using an Internet-capable communication device such as those described in FIG. 1 and FIGS. 12-13. The web portal 1402 can be configured, for example, to access a media processor 1206 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1206. The web portal 1402 can also be used for provisioning IMS services described earlier, provisioning Internet services, provisioning cellular phone services, and so on.

The web portal 1402 can further be utilized to manage and provision software applications 1262-1266, and 1372-1374 to adapt these applications as may be desired by subscribers and/or service providers of system 100 of FIG. 1, and communication systems 1200-1300. For instance, users of the services provided by server 110 or edge node 1230 can log into their on-line accounts and provision the servers 110 or edge node 1230 with features that a user may want to program, such as user profiles, provide contact information to server to enable it to communication with devices described in FIG. 1, and so on. Service providers can log onto an administrator account to provision, monitor and/or maintain the system 100 of FIG. 1 or edge node 1230.

Figure 15:
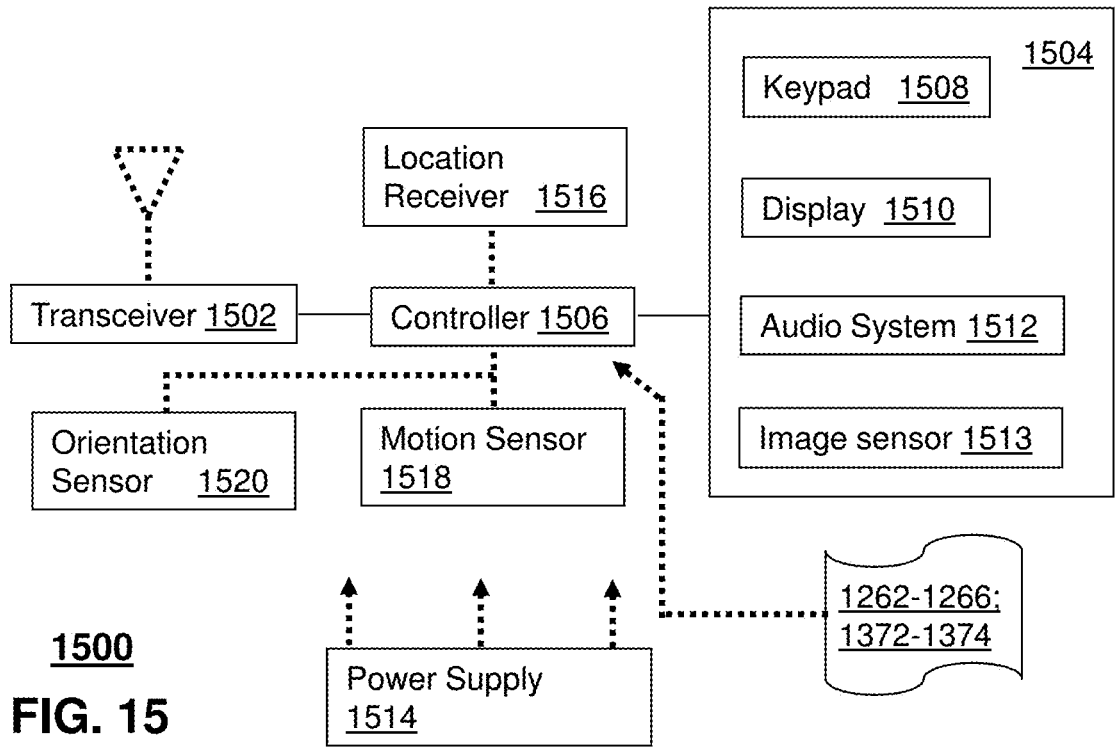
FIG. 15 depicts an illustrative embodiment of a communication device.

FIG. 15 depicts an illustrative embodiment of a communication device 1500. Communication device 1500 can serve in whole or in part as an illustrative embodiment of the devices depicted in FIGS. 1-3 and FIGS. 12-13 and can be configured to perform portions of methods 200-300 of FIGS. 2-3.

Communication device 1500 can comprise a wireline and/or wireless transceiver 1502 (herein transceiver 1502), a user interface (UI) 1504, a power supply 1514, a location receiver 1516, a motion sensor 1518, an orientation sensor 1520, and a controller 1506 for managing operations thereof. The transceiver 1502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface with graphical user interface (GUI) elements that can be selected by a user with a touch of a finger. The touch screen display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable applications. Alternatively, or in combination, the charging system can utilize external power sources such as DC power supplied over a physical interface such as a USB port or other suitable tethering technologies.

The location receiver 1516 can utilize location technology such as a global positioning system (GPS) receiver capable of assisted GPS for identifying a location of the communication device 1500 based on signals generated by a constellation of GPS satellites, which can be used for facilitating location services such as navigation. The motion sensor 1518 can utilize motion sensing technology such as an accelerometer, a gyroscope, or other suitable motion sensing technology to detect motion of the communication device 1500 in three-dimensional space. The orientation sensor 1520 can utilize orientation sensing technology such as a magnetometer to detect the orientation of the communication device 1500 (north, south, west, and east, as well as combined orientations in degrees, minutes, or other suitable orientation metrics).

The communication device 1500 can use the transceiver 1502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

Other components not shown in FIG. 15 can be used in one or more embodiments of the subject disclosure. For instance, the communication device 1500 can include a reset button (not shown). The reset button can be used to reset the controller 1506 of the communication device 1500. In yet another embodiment, the communication device 1500 can also include a factory default setting button positioned, for example, below a small hole in a housing assembly of the communication device 1500 to force the communication device 1500 to re-establish factory settings. In this embodiment, a user can use a protruding object such as a pen or paper clip tip to reach into the hole and depress the default setting button. The communication device 1500 can also include a slot for adding or removing an identity module such as a Subscriber Identity Module (SIM) card. SIM cards can be used for identifying subscriber services, executing programs, storing subscriber data, and so forth.

The communication device 1500 as described herein can operate with more or less of the circuit components shown in FIG. 15. These variant embodiments can be used in one or more embodiments of the subject disclosure.

The communication device 1500 can be adapted to perform the functions of devices of FIGS. 1-3, the media processor 1206, the media devices 1208, or the portable communication devices 1216 of FIG. 12, as well as the IMS CDs 1301-1302 and PSTN CDs 1303-1305 of FIG. 13. It will be appreciated that the communication device 1500 can also represent other devices that can operate in system 100 of FIG. 1, communication systems 1200-1300 of FIGS. 12-13 such as a gaming console and a media player. In addition, the controller 1506 can be adapted in various embodiments to perform the functions 1262-1266 and 1372-1374, respectively.

Upon reviewing the aforementioned embodiments, it would be evident to an artisan with ordinary skill in the art that said embodiments can be modified, reduced, or enhanced without departing from the scope of the claims described below. For example, additional control packets can be sent between the content streaming server, the controller, and the various virtual machine functions to affect different features, such as data encryption, digital rights management, or the like. For example, although the system has been described in an embodiment for live video content broadcasting, the system can be implemented to stream other types of digital media such as games, graphics, virtual reality frames, or the like. The system can support on-demand streaming and encryption of such media as well. Furthermore, the system is compatible with many different types of encryption and content management protocols, such as TLS. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 16:
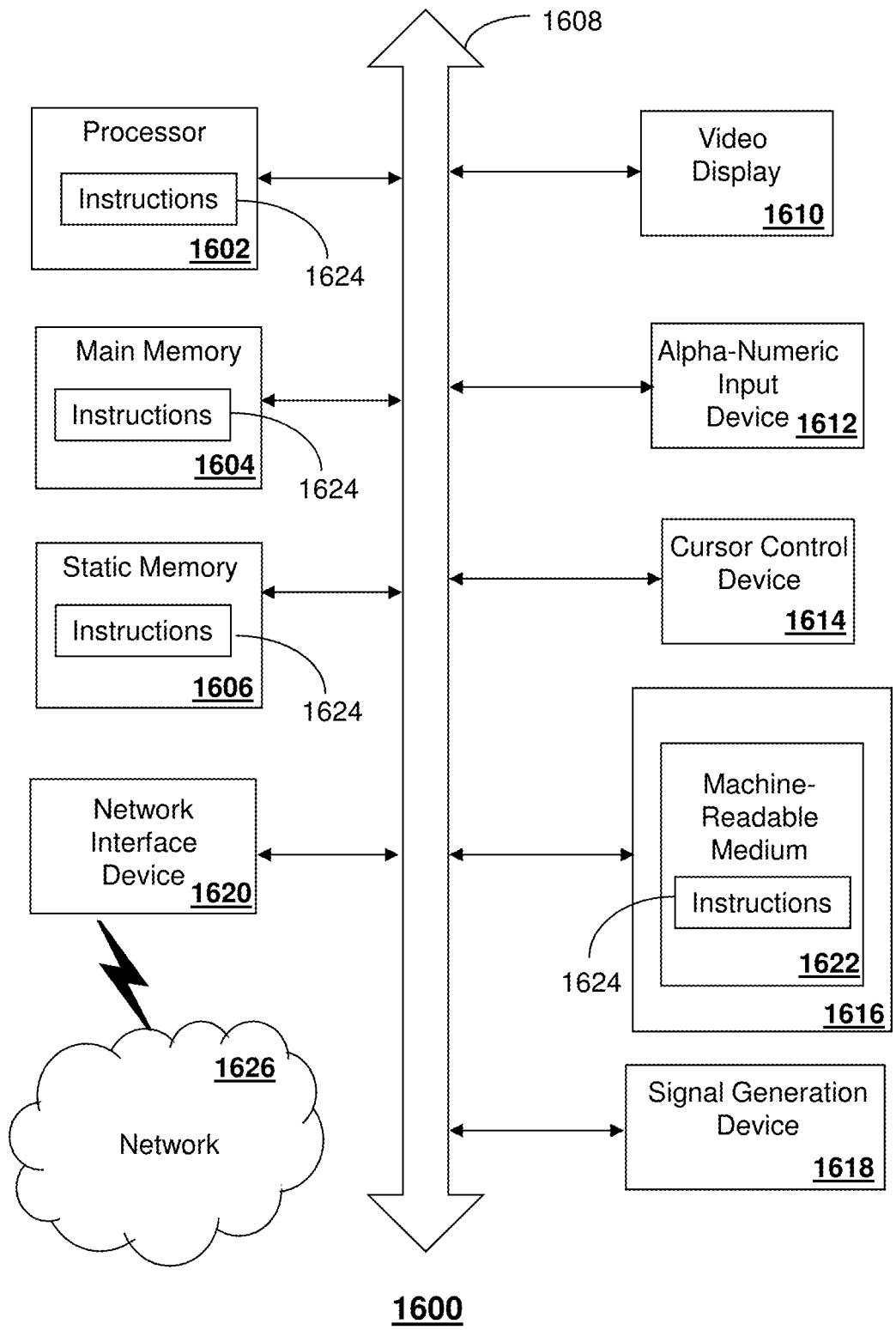
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can operate, for example, as the edge node 1230 or the media processor 1206 of FIG. 12, or the streaming server 110, the controller 120, the viewers 150 and other devices of FIGS. 1-3. In some embodiments, the machine may be connected (e.g., using a network 1626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor (or controller) 1602 (e.g., a central processing unit (CPU)), a graphics processing unit (GPU, or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 1600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

A virtual processing environment may support one or more virtual machines representing computers, servers, or other computing devices such as routers and networks. In such virtual machines, hardware components such as microprocessors and storage devices may be virtualized or logically represented. Virtual machines may provide a substitute for physical hardware. The virtual machine provides the functionality required to perform tasks normally performed by the physical hardware that the virtual machine represents, such as executing entire operating systems. Additional functionality, such as a hypervisor, uses native execution to manage the hardware and enable the virtualization of the hardware, allowing for multiple virtual machines to execute on the hardware that are isolated from one another. Many hypervisors use hardware-assisted virtualization, which virtualizes specific hardware, most often processors. When full virtualization is achieved, a completely simulated computer, or virtual machine, is capable of executing an unmodified guest operating system that executes in complete isolation.

One of the main advantages of deploying or launching a virtual machine is the ability to create an instance of a machine in physical locations of the host hardware. The main advantages of virtual machines are that multiple operating system environments can exist simultaneously on the same physical machine, isolated from each other, and the ability to offer an instruction set architecture that differs from the physical machine. Maintenance, application provisioning, availability and convenient recovery are hallmarks of virtual machine deployment. Virtualization potentially reduces the number of physical machines, thereby reducing energy required to power and cool them.

Cloud computing is the delivery of shared computing resources, software, processing or data—as a service and on-demand through the Internet. Virtualization is a foundational element of cloud computing that helps deliver value to a distributed physical network. Since, virtual machines are much faster to deploy than a new physical server, virtual machines provide processing, software or data services in a cloud-based network quickly, on demand Virtual machines that are assigned to complete physical tasks in a particular location can be assisted by additional remotely located virtual machines in networked communication with the assigned virtual machines that provide assistance to accomplish the task.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A cloud based network, comprising:
a content streaming server of a Content Delivery Network (CON) that delivers content data to a viewer device in a first streaming session, wherein the content data comprises live content data for viewing at a plurality of viewer devices including the viewer device;
a central controller performing control operations responsive to a query from the viewer device to control delivery of the content data to the plurality of viewer devices including the viewer device; and
a plurality of edge nodes, each edge node associated with an Internet Service Provider (ISP) and located between the content streaming server and the viewer device of the plurality of viewer devices to deliver the content data from the content streaming server to viewer devices including the viewer device for rapidly increasing serving capacity of the CDN for popular live content items, each edge node comprising:
processing system including a processor; and
a memory that stores executable instructions that, when executed by the processing system, facilitate performance of operations, comprising:
facilitating, responsive to the content streaming server informing the central controller of a request from the viewer device to view the content data and responsive to the content streaming server delivering the first streaming session, a first transport connection of the content streaming server and the viewer device and a second transport connection of the viewer device with the content streaming server to convey the content data to the viewer device;
launching a virtual machine at a selected location having a distance from the viewer device that is determined to facilitate a rapidly increasing serving capacity of the CDN for the popular live content items responsive to receiving an instruction from the central controller, the instruction from the central controller identifying the content data, a transport connection between the content streaming server and the viewer device and a transport connection between the content streaming server and the virtual machine;
initiating, by the virtual machine, a second streaming session with the content streaming server, according to the transport connection between the content streaming server and the virtual machine, to receive the content data while the content streaming server conveys the content data to the viewer device;
creating a first transport connection from the virtual machine to the viewer device by imitating the first transport connection of the content streaming server with the viewer device;
creating a second transport connection between the virtual machine and the content streaming server by imitating the second transport connection of the viewer device with the content streaming server;
conveying, by the virtual machine, the content data of the first streaming session from the content streaming server over the second transport connection to the viewer device over the first transport connection;
creating a third transport connection from the virtual machine to a second viewer device of the plurality of viewer devices responsive to a query from the second viewer device to the content streaming server to view the live content data, wherein the content streaming server is responsive to the query from the second viewer device to inform the central controller of the request from the second viewer device to view the content data and wherein the creating a third transport connection is responsive to receiving a second instruction from the central controller, the second instruction from the central controller identifying the content data, a transport connection between the content streaming server and the second viewer device and the transport connection between the streaming content server and the virtual machine;
replicating, by the virtual machine, the content data including the live content data, forming replicated content data; and
conveying, by the virtual machine, the replicated content data over the third transport connection to the second viewer device for viewing of the live content data at the second viewer device.

2. The cloud based network for delivering content data to viewer devices of claim 1, wherein the instruction from the central controller instructs an edge node in the plurality of edge nodes to launch the virtual machine at the selected location.

3. The cloud based network for delivering the live content data to the plurality of viewer devices of claim 2, wherein the live content data comprises broadcast content data, and a demand of the plurality of viewer devices for delivery of content data generated based on the live content data.

4. The cloud based network for delivering content data to viewer devices of claim 2, wherein the central controller instructs the edge node in the plurality of edge nodes to launch the virtual machine based on proximity of the edge node to the viewer device.

5. The cloud based network for delivering content data to viewer devices of claim 2, wherein the central controller instructs the edge node in the plurality of edge nodes to launch the virtual machine based on proximity of the content streaming server.

6. The cloud based network for delivering content data to viewer devices of claim 2, wherein the central controller instructs the edge node in the plurality of edge nodes to launch the virtual machine based on resources in the cloud based network.

7. The cloud based network for delivering content data to viewer devices of claim 2, wherein the content streaming server notifies the central controller that the viewer device is streaming the content data in the first streaming session.

8. The cloud based network for delivering content data to viewer devices of claim 7, wherein the first streaming session is implemented using a real-time messaging protocol.

9. The cloud based network for delivering content data to viewer devices of claim 2, further comprising a plurality of proxy servers that provide the content data from the content streaming server; and a dynamic domain name server is configured to bad balance the proxy servers.

10. The cloud based network for delivering content data to viewer devices of claim 2, wherein the processing system comprises a plurality of processors operating in a distributed processing environment.

11. A non-transitory machine-readable storage medium, comprising executable instructions that, when executed by a virtual processing system including a virtual processor, facilitate performance of operations, comprising:
    initiating the virtual processing system in a node on a network path of a first streaming session between a content streaming server of a Content Delivery Network (CDN) and a viewer device of a plurality of viewer devices, wherein the first streaming session includes a first transport connection of the content streaming server and the viewer device and a second transport connection of the viewer device with the content streaming server to convey content data from the content streaming server to the viewer device, the first streaming session to convey the content data from the virtual processing system to the viewer device, wherein the content data comprises live content data for viewing at the plurality of viewer devices including the viewer device, wherein the node comprises an edge node of a plurality of edge nodes associated with an Internet Service Provider (ISP), the edge node selected by a central controller at a selected location having a distance from the viewer device that is determined by the central controller to facilitate rapidly increasing serving capacity of the CON to viewer devices including the viewer device for popular live content items, wherein the initiating the virtual processing system is responsive to receiving an instruction from the central controller, the instruction from the central controller identifying the content data, the first transport connection and the second transport connection:
    creating, responsive to receiving the instruction from the central controller, a second streaming session between the virtual processing system and the content streaming server according to the first transport connection, the second streaming session to receive the content data from the content streaming server;
    creating, responsive to receiving the instruction from the central controller, a first transport connection between the virtual processing system and the viewer device and streaming the content data in a third streaming session by imitating the first transport connection of the content streaming server with the viewer device;
    creating, responsive to receiving the instruction from the central controller, a second transport connection between the virtual processing system and the content streaming server by imitating the second transport connection of the viewer device with the content streaming server;
    receiving, by the virtual processing system, the content data of the first streaming session from the content streaming server over the second transport connection and delivering the received content data to the viewer device over the first transport connection;
    streaming the live content data to the viewer device by injecting the live content data into the first transport connection;
    creating a third transport connection between the virtual processing system and a second viewer device of the plurality of viewer devices responsive to a query from the second viewer device to view the live content data, wherein the content streaming server is responsive to the query from the second viewer device to inform the central controller of the query from the second viewer device to view the content data and wherein the creating a third transport connection is responsive to receiving a second instruction from the central controller, the second instruction from the central controller identifying the live content data, a transport connection between the content streaming server and the second viewer device and the transport connection between the content streaming server and the virtual processing system;
    replicating, at the virtual processing system, the content data including the live content data, forming replicated content data; and
    delivering the replicated content data to the second viewer device over the third transport connection for viewing of the live content data at the second viewer device.

12. The non-transitory machine-readable storage medium of claim 11, wherein the virtual processing system comprises a plurality of virtual processors operating in a distributed processing environment.

13. A method, comprising:
    receiving, by a controller in a network, the controller comprising a processing system including a processor, a register viewer request from a content streaming server of a Content Delivery Network (CON), wherein the content streaming server delivers content data over a first transport connection of the content streaming server to a viewer device identified in the register viewer request via a first streaming session and wherein the viewer device communicates with the content streaming server over a second transport connection of the viewer device, wherein the content data comprises live content data for viewing at a plurality of viewer devices including the viewer device;
    selecting, by the controller, an edge node in a plurality of edge nodes in the network, each edge node of the plurality of edge nodes being associated with an Internet Service Provider (BP), the edge node being selected at a location having a distance from the viewer device that is determined to facilitate rapidly increasing serving capacity of the CDN to viewer devices including the viewer device for popular live content items, wherein the selecting is responsive to the register viewer request;

routing, by the controller, the first transport connection of the content streaming server of the first streaming session from the content streaming server to the edge node;

sending, by the controller, instructions to the edge node to prepare a virtual machine, the instructions identifying the content data, the first transport connection between the content streaming server and the viewer device and the second transport connection between the content streaming server and the edge node, wherein the virtual machine is responsive to the instructions to initiate a second streaming session with the content streaming server to receive the live content data, to create a first transport connection with the viewer device by imitating the first transport connection of the content streaming server, and to create a second transport connection with the content streaming server by imitating the second transport connection of the viewer device;

returning, by the controller, responsive to a readiness indication provided by the virtual machine, a notification to the content streaming server identifying the virtual machine receiving, by the controller, a second register viewer request from the content streaming server for delivery of the live content data to a second viewer device of the plurality of viewer devices;

routing, by the controller, a third transport connection from the edge node to the second viewer device, wherein the routing the third transport connection is responsive to the second register viewer request;

sending, by the controller, instructions to the virtual machine, to replicate the live content data, forming replicated data, wherein the instructions are responsive to the second register viewer request and identify the live content data, the transport connection between the content streaming server and the second viewer device; and sending, by the controller, to the virtual machine, transport information of the third transport connection, wherein the virtual machine conveys the live content data to the second viewer device for viewing of the live content data at the second viewer device.

14. The method of claim 13, wherein the content streaming server streams the content data to the virtual machine via the second streaming session.

15. The method of claim 14, wherein the virtual machine splits the first streaming session between the content streaming server and the viewer device and streams the content data received via the second streaming session to the viewer device.

16. The method of claim 13, wherein the controller selects the edge node based on proximity to the viewer device identified in the register viewer request.

17. The method of claim 13, further comprising instructing, by the controller, the edge node to destroy the virtual machine based on a reduction in demand for the content data.

18. The method of claim 13, further comprising detecting, by the controller, failure of the virtual machine through signaling messages received from the second streaming session.

19. The method of claim 18, wherein the edge node forwards signaling messages received from the second streaming session indicating a failure of the virtual machine.

20. The method of claim 18, further comprising terminating, by the controller, the second streaming session.

* * * * *

UNITED STATES PATENT AND TRADEMARK OFFICE
CERTIFICATE OF CORRECTION

PATENT NO. : 11,108,840 B2  
APPLICATION NO. : 15/641049  
DATED : August 31, 2021  
INVENTOR(S) : Shu Shi et al.

Page 1 of 1

It is certified that error appears in the above-identified patent and that said Letters Patent is hereby corrected as shown below:

In the Claims

Claim 1, second paragraph, Line 1, "CON" should read --CDN--.

Claim 13, second paragraph, Line 4, "CON" should read --CDN--.

Claim 13, third paragraph, Line 4, "BP" should read --ISP--.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*